United States Patent
Endo et al.

(10) Patent No.: US 11,488,431 B2
(45) Date of Patent: *Nov. 1, 2022

(54) KEY INFORMATION MANAGEMENT DEVICE, MANAGEMENT METHOD OF KEY INFORMATION, COMPUTER-READABLE NON-TRANSITORY STORAGE MEDIUM STORING KEY INFORMATION MANAGEMENT PROGRAM

(71) Applicant: TOYOTA JIDOSHA KABUSHIKI KAISHA, Toyota (JP)

(72) Inventors: Masato Endo, Nagakute (JP); Yuichiro Haruna, Oyama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/086,423

(22) Filed: Nov. 1, 2020

(65) Prior Publication Data

US 2021/0049849 A1 Feb. 18, 2021

Related U.S. Application Data

(63) Continuation of application No. 16/209,282, filed on Dec. 4, 2018, now Pat. No. 10,891,815.

(30) Foreign Application Priority Data

Dec. 6, 2017 (JP) .............................. JP2017-234194

(51) Int. Cl.
*G07C 9/28* (2020.01)
*G07C 9/00* (2020.01)
(Continued)

(52) U.S. Cl.
CPC ................ *G07C 9/28* (2020.01); *B60R 25/01* (2013.01); *B60R 25/24* (2013.01); *G06Q 10/083* (2013.01);
(Continued)

(58) Field of Classification Search
CPC ........ G07C 9/28; G07C 9/21; G07C 9/00309; G07C 9/00571; G07C 2009/00769; G07C 2209/63; G06Q 10/083; G06Q 50/28
See application file for complete search history.

(56) References Cited

U.S. PATENT DOCUMENTS 7,653,603 B1 * 1/2010 Holtkamp, Jr. ......... E05G 1/005
705/72
2012/0313796 A1 12/2012 Lee et al.
(Continued)

FOREIGN PATENT DOCUMENTS

CN 104094178 A 10/2014
CN 105122281 A 12/2015
(Continued)

*Primary Examiner* — Nabil H Syed
(74) *Attorney, Agent, or Firm* — Hunton Andrews Kurth LLP

(57) ABSTRACT

A key information management device includes: a key information distribution unit configured to distribute key information to a company that provides a delivery service that allows an inside of a vehicle, a building, or a facility used by a user to be designated as a delivery destination of a package, key information being used by a delivery person of the company to unlock a specified entrance of the vehicle, the building, or the facility; and a determination unit configured to determine whether or not the delivery person who delivers the package has reached within a specified range of the vehicle, the building, or the facility, wherein the key information distribution unit is configured to distribute the key information to the company when the determination unit
(Continued)

determines that the delivery person has reached within the specified range of the vehicle, the building, or the facility.

6 Claims, 9 Drawing Sheets

(51) Int. Cl.
    *G06Q 10/08*     (2012.01)
    *B60R 25/01*     (2013.01)
    *B60R 25/24*     (2013.01)
    *G06Q 50/28*     (2012.01)
    *G07C 9/21*     (2020.01)

(52) U.S. Cl.
    CPC .......... *G06Q 50/28* (2013.01); *G07C 9/00309* (2013.01); *G07C 9/00571* (2013.01); *G07C 9/21* (2020.01); *G07C 2009/00769* (2013.01); *G07C 2209/63* (2013.01)

(56) References Cited

U.S. PATENT DOCUMENTS

| | | |
|---|---|---|
| 2016/0098871 A1 | 4/2016 | Oz et al. |
| 2016/0133070 A1 | 5/2016 | Ikeda |
| 2017/0372542 A1* | 12/2017 | Romero ............. G07C 9/00896 |
| 2018/0061164 A1* | 3/2018 | Scalisi ............... G07C 9/00309 |
| 2018/0204177 A1* | 7/2018 | Ferla ..................... H04W 12/06 |
| 2019/0172283 A1 | 6/2019 | Endo et al. |

FOREIGN PATENT DOCUMENTS

| | | |
|---|---|---|
| CN | 107077788 A | 8/2017 |
| JP | 2006-206225 A | 8/2006 |
| JP | 2015-045141 A | 3/2015 |
| TW | 201534513 A | 9/2015 |
| WO | 2013130201 A1 | 9/2013 |
| WO | 2014063179 A1 | 5/2014 |
| WO | 2016054271 A1 | 4/2016 |

* cited by examiner

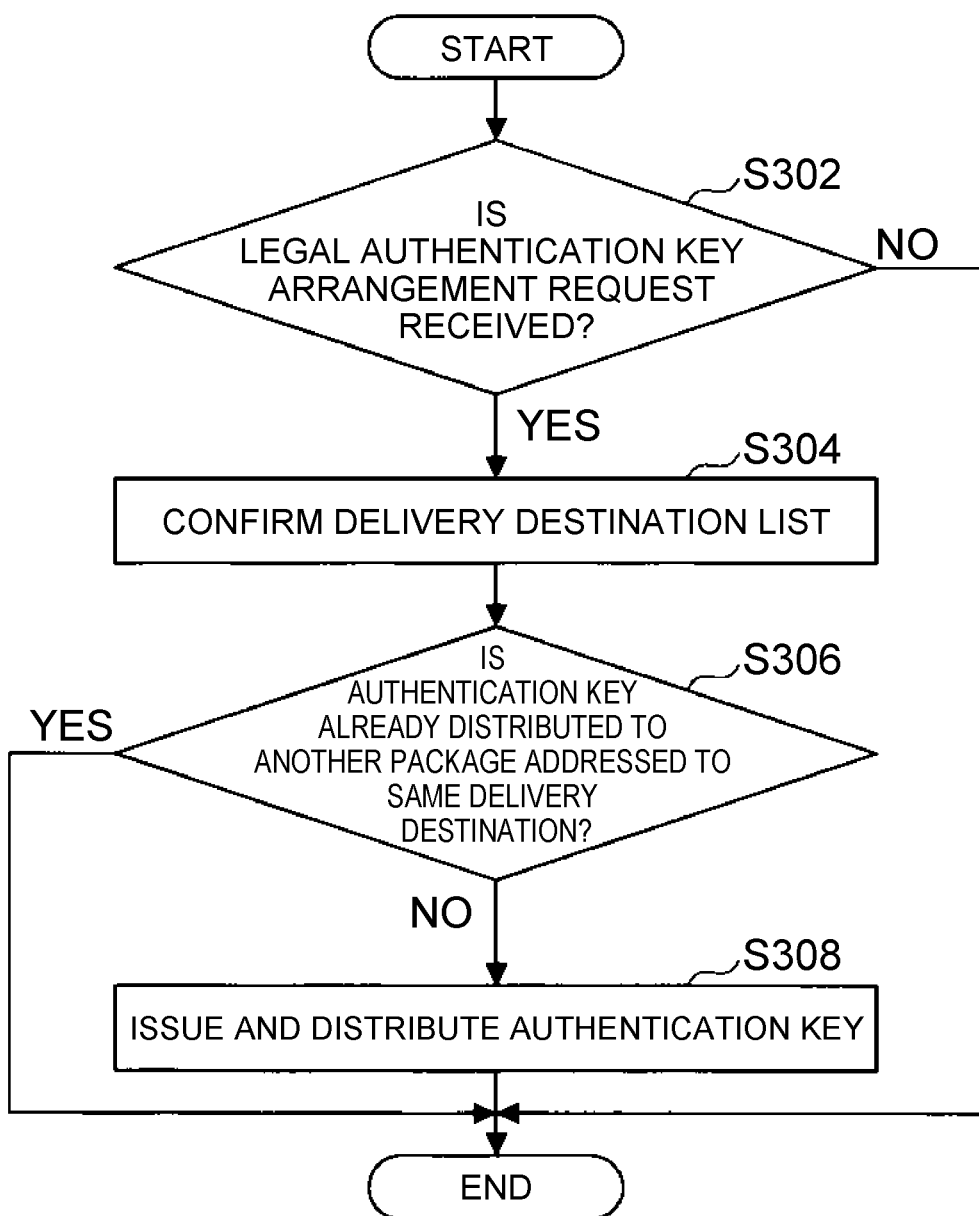

KEY INFORMATION MANAGEMENT DEVICE, MANAGEMENT METHOD OF KEY INFORMATION, COMPUTER-READABLE NON-TRANSITORY STORAGE MEDIUM STORING KEY INFORMATION MANAGEMENT PROGRAM

INCORPORATION BY REFERENCE

This is a continuation application of U.S. patent application Ser. No. 16/209,282, filed Dec. 4, 2018, which claims the disclosure of Japanese Patent Application No. 2017-234194 filed on Dec. 6, 2017. The specification, drawings and abstract are both incorporated herein by reference in their entirety.

BACKGROUND

1. Technical Field

The present disclosure relates to a key information management device, a management method of key information, and a computer-readable non-transitory storage medium storing a key information management program.

2. Description of Related Art

For example, there is a scheme for using the inside of a vehicle cabin, such as a trunk, as a delivery destination of a package (see Japanese Patent Application Publication No. 2006-206225 or the like).

Specifically, authentication information (key information) for unlocking a vehicle is distributed to a delivery company (for example, a mobile terminal carried by a delivery person). When a specified transmission signal that includes key information is transmitted toward the vehicle from the mobile terminal carried by the delivery person, and authentication based on the key information included in the transmission signal is successful on the vehicle side, an entrance (for example, a trunk lid or a back door) for accessing the trunk of the vehicle is unlocked. Hence, the delivery person can store a package in the trunk. Accordingly, the delivery company can provide customers with a delivery service (hereinafter referred to as "vehicle cabin delivery service") that allows the inside of a vehicle cabin, such as the trunk of a vehicle, to be designated as a delivery destination. It is also possible to provide a delivery service that allows, for example, the inside of a lockable and unlockable building and a facility used by a user, such as a residence or a cottage (a privately-owned cottage or a vacation cottage for rent), to be designated as a delivery destination in a similar manner.

SUMMARY

However, key information on a vehicle, a building, or a facility (hereinafter referred to as "a vehicle or the like" for the sake of convenience) that is designated as a delivery destination of a package is distributed to a delivery company, although the key information is distributed for a limited time. Hence, it is desirable to provide a scheme in which the key information is distributed so as to minimize an inadequate use of the key information by the delivery company from the perspective of security.

In a delivery service that allows the inside of a vehicle or the like used by a user to be designated as a delivery destination of a package, there is provided a key information management device or the like, capable of distributing key information used for unlocking the vehicle or the like so as to suppress an inadequate use of the key information by a delivery company.

A key information management device according to a first aspect of the present disclosure includes: a key information distribution unit configured to distribute key information to a company that provides a delivery service that allows an inside of a vehicle, a building, or a facility used by a user to be designated as a delivery destination of a package, key information being used by a delivery person of the company to unlock a specified entrance of the vehicle, the building, or the facility; and a determination unit configured to determine whether or not the delivery person who delivers the package has reached within a specified range of the vehicle, the building, or the facility, wherein the key information distribution unit is configured to distribute the key information to the company when the determination unit determines that the delivery person has reached within the specified range of the vehicle, the building, or the facility.

According to the above aspect, the key information management device can wait for the timing when the delivery person reaches the vicinity of the vehicle or the like (within a specified range), that is, the timing when the delivery company requires key information, and then distribute the key information to the delivery company. Hence, the key information management device can limit the opportunity in which the delivery company can inadequately use the key information. Therefore, the key information management device can distribute key information so as to suppress an inadequate use of the key information by the delivery company.

In the above aspect, the entrance may be configured to be unlocked by transmitting a specified transmission signal including the key information transmitted toward the vehicle, the building, or the facility from a mobile terminal carried by the delivery person who delivers the package.

According to the aspect, the information processing device can specifically distribute key information that can unlock the entrance of a vehicle or the like by using the key information configured to be included in a specified transmission signal transmitted toward the vehicle or the like from the mobile terminal carried by the delivery person.

The above aspect may further includes: a vehicle location information acquisition unit configured to acquire location information on the vehicle, the building, or the facility; and a delivery person location information acquisition unit configured to acquire location information on the mobile terminal carried by the delivery person, wherein the determination unit may be configured to determine whether or not the delivery person has reached within the specified range of the vehicle, the building, or the facility based on the location information on the vehicle, the building, or the facility, and on the location information on the mobile terminal.

According to the aspect, the key information management device can specifically determine whether or not the delivery person has reached the vicinity of the vehicle or the like (within a specified range) based on the location information on the vehicle or the like, and on the location information on the mobile terminal of the delivery person.

The above aspect may further include: a reception unit configured to receive from the vehicle, the building, or the facility information that a communicable state for transmitting the transmission signal toward the vehicle, the building, or the facility from the mobile terminal of the delivery person has been established between the mobile terminal and the vehicle, the building or the facility in accordance with a specified protocol, wherein when the reception unit receives the information, the determination unit may be configured to determine that the delivery person has reached within the specified range of the vehicle, the building, or the facility.

According to the aspect, the key information management device can obtain the fact that the delivery person has reached the vicinity of the vehicle or the like (within the specified range) based on the information received from the vehicle or the like, the information indicating that the communicable state has been established between the mobile terminal of the delivery person and the vehicle or the like in accordance with a specified protocol. Therefore, the key information management device can specifically determine that the delivery person has reached the vicinity of the vehicle or the like, based on the information received from the vehicle or the like, the information indicating that the communicable state has been established between the mobile terminal of the delivery person and the vehicle or the like in accordance with a specified protocol.

In the above aspect, when the delivery person delivers a plurality of the packages to the inside of the vehicle, the building, or the facility at the same timing, the key information distribution unit may be configured to distribute the key information for each delivery performed by the delivery person.

According to the aspect, when a plurality of packages is collectively delivered with the inside of a vehicle or the like as a delivery destination, the key information management device can distribute key information to a delivery company for each delivery, that is, for a group of packages, instead of for each package. Hence, the key information management device can avoid the situation where a plurality of pieces of key information is distributed to a delivery company for each of the packages though the packages are collectively delivered in one delivery session. This makes it possible to limit the opportunity in which the delivery company can inadequately use the key information. Therefore, the key information management device can distribute the key information so as to further suppress an inadequate use of the key information by a delivery company.

A key information management method according to a second aspect of the present disclosure includes: a key information distribution step of distributing key information to a company that provides a delivery service that allows an inside of a vehicle, a building, or a facility used by a user to be designated as a delivery destination of a package, key information being used by a delivery person of the company to unlock a specified entrance of the vehicle, the building, or the facility; and a determination step of determining whether or not the delivery person who delivers the package has reached within a specified range of the vehicle, the building, or the facility, wherein the key information distribution step distributes the key information to the company when it is determined in the determination step that the delivery person has reached within the specified range of the vehicle, the building, or the facility.

A third aspect of the present disclosure is a computer-readable non-transitory storage medium storing a key information management program. The key information management program includes: a key information distribution step of distributing key information to a company that provides a delivery service that allows an inside of a vehicle, a building, or a facility used by a user to be designated as a delivery destination of a package, key information being used by a delivery person of the company to unlock a specified entrance of the vehicle, the building, or the facility; and a determination step of determining whether or not the delivery person who delivers the package has reached within a specified range of the vehicle, the building, or the facility, wherein the key information distribution step distributes the key information to the company when it is determined in the determination step that the delivery person has reached within the specified range of the vehicle, the building, or the facility.

The aforementioned embodiment can provide, in a delivery service that allows the inside of a vehicle or the like used by a user to be designated as a delivery destination of a package, a key information management device or the like, capable of distributing key information used for unlocking the vehicle or the like so as to suppress an inadequate use of the key information by a delivery company.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a flowchart schematically showing a third example of the authentication key distribution process by the center server.

DETAILED DESCRIPTION OF EMBODIMENTS

Embodiments of the present disclosure will be described below with reference to the drawings.

Overall Configuration of Key Information Management System

Figure 1:
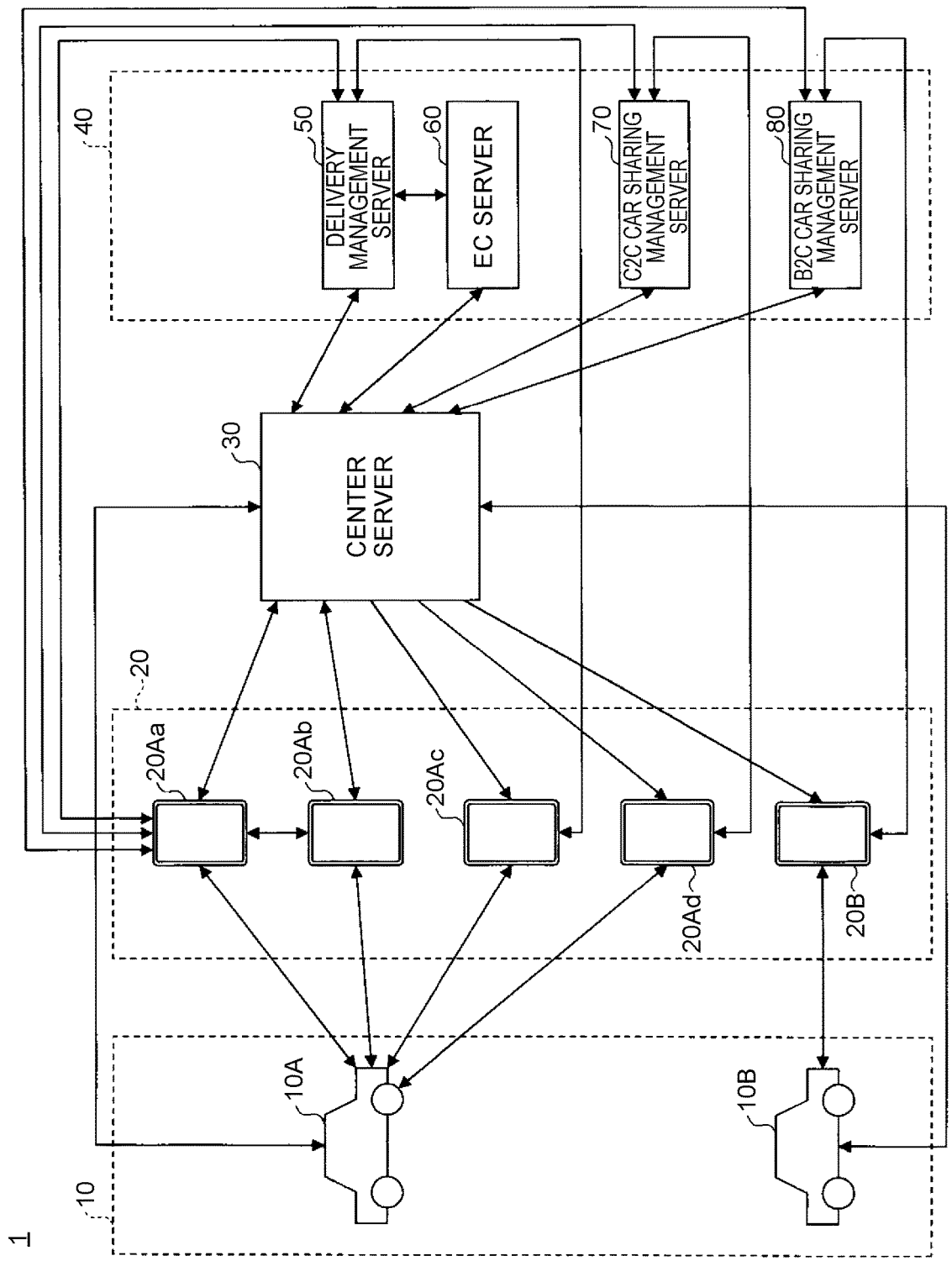
FIG. 1 shows one example of the overall configuration of an authentication key management system.

FIG. 1 illustrates one example of the overall configuration of a key information management system according to an embodiment.

An authentication key management system 1 includes vehicles 10, mobile terminals 20, a center server 30, and a service management server 40.

The vehicles 10 can perform wireless communication (hereinafter referred to as "near-field communication") at a relatively close range (a range close enough to allow communication between the inside of a vehicle cabin and the outside of the vehicle cabin) with one of the mobile terminals 20 in conformity with specified communication standards. The vehicles 10 are each subjected to locking and unlocking of entrances, such as doors, and start (ignition-on) of the vehicle, based on transmission signals (an authentication request, a lock request, and an unlock request, which will be described later) from one of the mobile terminals 20. The doors of the vehicles 10 may include not only entrance doors but also a luggage compartment door (for example, a trunk lid, a back door, or the like) for accessing a trunk (luggage compartment). The ignition-on (IG-ON) of the vehicles 10 may include startup of an engine in the vehicle 10 using the engine as a main power source, as well as power-on of an electric motor in the vehicles 10 using an electric motor as a main power source. Hereinafter, in the present embodiment, description will be made on the assumption that the vehicles 10 use a later-described engine 117 as a main power source, the start (IG-ON) of the vehicles 10 corresponds to startup of the engine 117, and stop (IG-OFF) of the vehicles 10 corresponds to stop of the engine 117.

The vehicles 10 are each communicably connected with the center server 30 through a specified communication network (for example, a mobile phone network having a large number of base stations as terminals, the Internet, or the like). The vehicles 10 transmit vehicle information, such as location information, to the center server 30 as described later.

The vehicles 10 include a privately-owned vehicle 10A and a vehicle 10B owned by a business-to-consumer (B2C) car sharing service provider.

The mobile terminals 20 are communicably connected with the center server 30 through a specified communication network (for example, a mobile phone network having a large number of base stations as terminals, the Internet, or the like). The mobile terminals 20 can each unlock or lock an intended vehicle 10 by acquiring authentication key information (an example of key information; hereinafter referred to as "authentication key") that is distributed from the center server 30, and transmitting the acquired authentication key to the intended vehicle 10 by relatively close-range wireless communication in response to a specified operation of a user. The mobile terminals 20 may be, for example, general-purpose cellular phones, smartphones, or tablet terminals. As described later, the above-described functions of the mobile terminals 20 may be implemented when a predetermined application program (hereinafter, referred to as "key application") that is installed onto a built-in processing device 23 is activated. The mobile terminals 20 may each be a portable special-purpose terminal specialized to acquire an authentication key from the center server 30, and to unlock the doors of the intended vehicle 10 and to start the intended vehicle 10 with use of the acquired authentication key. The mobile terminals 20 include mobile terminals 20Aa to 20Ad corresponding to the vehicle 10A, and a mobile terminal 20B corresponding to the vehicle 10B.

The mobile terminal 20Aa is a mobile terminal carried by an owner (owner user) among users regularly using the vehicle 10A (hereinafter referred to as "regular users"). The mobile terminal 20Aa may be bidirectionally communicable with the mobile terminal 20Ab by relatively close-range wireless communication.

The mobile terminal 20Ab is a mobile terminal carried by a regular user other than the owner user of the vehicle 10A (for example, including family members of the owner user, close friends of the owner user, and the like; hereinafter, referred to as "child users").

The child users may include a user who does not drive the vehicle 10A and a user who is not permitted to drive the vehicle 10A (for example, a child under 18 years of age of the owner user, or the like). This is because in the case of using, for example, only a trunk delivery service described later, the regular users do not need to drive the vehicle 10A.

The mobile terminal 20Ac is carried by a delivery person of a company that provides a trunk delivery service described later (hereinafter, simply referred to as "delivery company"). The mobile terminal 20Ac is communicably connected with the center server 30 and a delivery management server 50 described later through a specified communication network (for example, a mobile phone network having a large number of base stations as terminals, the Internet, or the like).

The mobile terminal 20Ad is a mobile terminal owned by a renter of the vehicle 10A in a C2C car sharing service described later. The mobile terminal 20Ad is communicably connected to the center server 30 and a later-described C2C car sharing management server 70 through a specified network (for example, a mobile phone network having a large number of base stations as terminals, the Internet, or the like).

The mobile terminal 20B is a mobile terminal carried by a renter of the vehicle 10B in a B2C car sharing service described later. The mobile terminal 20B is communicably connected with the center server 30 and a B2C car sharing management server 80 through a specified communication network (for example, a mobile telephone network having a large number of base stations as terminals, the Internet, or the like).

The center server 30 is communicably connected with the vehicles 10, the mobile terminals 20, and the service management server 40.

The center server 30 manages issuance of authentication keys of the vehicles 10. For example, the center server 30 issues an authentication key and delivers the authentication key to an intended mobile terminal 20 in accordance with a specified condition.

The center server 30 also acquires from the vehicles 10 their location information. Thus, the center server 30 can get the locations of the vehicles 10.

The center server 30 also operates a car sharing service for sharing the vehicle 10A among the plurality of regular users including the owner user of the vehicle 10A. Specifically, the center server 30 operates an authentication key sharing service (key sharing service) that allows each of the pre-registered regular users, including the owner user, to acquire the authentication key of the vehicle 10A into their own mobile terminals 20 (the mobile terminals 20Aa, 20Ab).

The center server 30 also performs a registration process (use registration process) for the regular users of the vehicle 10A to use a service using the vehicle 10A (the key sharing service, the trunk delivery service, the C2C car sharing service, or the like). Specifically, for the regular users of the vehicle 10A to use a service using the vehicle 10A, the center server 30 registers authorization (hereinafter, referred to as "authentication key arrangement authorization") to distribute an authentication key to a specified mobile terminal 20 when a later-described key sharing management unit 327 or the service management server 40 transmits a later-described authentication key arrangement request.

The center server 30 also manages use statuses of the vehicle 10A over a plurality of services (that is, a plurality of companies), such as the trunk delivery service and the C2C car sharing service described later.

The service management server 40 manages operations of various services that are provided by using the vehicles 10. The service management server 40 includes the delivery management server 50 and an electronic commerce (EC) server 60 that correspond to the trunk delivery service, the C2C car sharing management server 70 that corresponds to the C2C car sharing service, and the B2C car sharing management server 80 that corresponds to the B2C car sharing service.

The trunk delivery service may include a delivery service for dealing with articles ordered on a later-described EC site as packages to be delivered, and a delivery service for dealing with articles other than the articles ordered on the EC site as packages to be delivered. The latter trunk delivery service is, for example, a service that allows the regular user of the vehicle 10A to change the delivery destination to the trunk of the vehicle 10A, when a notification notifying that a package addressed to the user's residence is scheduled to be delivered is provided from the delivery management server 50 to the regular user through an electric mail, an account of a social networking service (SNS), or a specific application program that is activated on the mobile terminal 20Aa or 20Ab. Hereinafter, in the present embodiment, the former trunk delivery service will be mainly described, though the operations of the components related to the trunk delivery service described later are also applicable to the operations of the components related to the latter trunk delivery service where appropriate.

The delivery management server 50 is communicably connected with the mobile terminal 20Ac and the center server 30 through a specified communication network so as to manage operations of a logistics system associated with the trunk delivery service ranging from acceptance of a package to delivery of the package to the trunk of the vehicle 10A.

The delivery company that operates the delivery management server 50 may provide the regular users of the vehicle 10A a delivery service that allows the inside of the vehicle cabin other than the trunk of the vehicle 10A to be designated as a delivery destination instead of or in addition to the trunk of the vehicle 10. Hereinafter, the delivery service that allows the inside of the vehicle cabin (that is, the inside of the vehicle 10A) including the trunk of the vehicle 10A to be designated as a delivery destination is referred to as "vehicle cabin delivery service". The delivery company that operates the delivery management server 50 may provide the regular users of the vehicle 10A with not only the vehicle cabin delivery service but also a pickup service (hereinafter referred to as vehicle cabin pickup service) that allows the inside of the vehicle cabin including the trunk to be designated as a pickup destination for a package. That is, the delivery management server 50 may manage operations of the vehicle cabin pickup service instead of or in addition to the vehicle cabin delivery service. In this case, a package to be picked up may be an article (that is, an article purchased on the EC site) that is returned to the operator of the EC site (or a shop opened on the EC site) corresponding to the EC server 60, or may be a delivery package irrelevant to the EC site. The vehicle cabin pickup service may also be implemented as a pickup service when a company (for example, a laundry company dealing with clothes and the like) that provides a service configured to temporarily keep articles of customers picks up a package from the regular user of the vehicle 10A. In this case, the laundry company or the like may provide a pickup management server that manages operations of the vehicle cabin pickup service, which may be included in the service management server 40 as in the case of the delivery management server 50. That is, the pickup management server may be provided instead of or in addition to the delivery management server 50. A company (for example, a recycle service provider, an antique buyer, or the like) that provides a service configured to collect from customers specified items (items such as wastes and second-hand books that the customers desire to sell) may provide the regular users of the vehicle 10A with a collection service (hereinafter, referred to as "vehicle cabin collection service") that allows the vehicle cabin of the vehicle 10A to be designated as a collection destination for an item to be collected. In this case, the recycle service provider or the like may provide a collection management server that manages operations of the trunk collection service, which may be included in the service management server 40 as in the case of the delivery management server 50. That is, the collection management server may be provided instead of or in addition to the delivery management server 50.

The EC server 60 is communicably connected with the center server 30 and the delivery management server 50 through a specified communication network, and operates a specified website (EC site) that sells articles or services. Specifically, the EC server 60 displays the trunk of the vehicle 10A as a choice for delivery destination on an order page of the EC site for the pre-registered regular users of the vehicle 10A and the delivery company (the delivery company corresponding to the delivery management server 50). Thus, the regular users of the vehicle 10A can get delivery of purchased articles to the trunk of the vehicle 10A when the regular users are not at home.

The C2C car sharing management server 70 is communicably connected with the mobile terminal 20Ad and the center server 30 to manage operations of the C2C car sharing service that assists in lending and renting the vehicle 10A between individuals. For example, the C2C car sharing management server 70 manages operations of the C2C car sharing service such as accepting registration of a lendable date and time of the vehicle 10A from the owner user, accepting a reservation for use from a person who wants to rent the vehicle 10A, and arrangements for the authentication key of the vehicle 10A. The C2C car sharing management server 70 may manage operations of the C2C trunk sharing service configured to lend the vehicle cabin or the trunk of the privately-owned vehicle 10A as a temporary luggage storage, a delivery destination for a package, or the like.

The B2C car sharing management server 80 is communicably connected with the mobile terminal 20B and the center server 30 to manage operations of the B2C car sharing service that lends the vehicle 10B owned by a specified company (for example, a provider of the B2C car sharing service) such that general consumers can share the vehicle 10B. For example, the B2C car sharing management server manages operations of the B2C car sharing service, such as accepting a reservation for the use of the vehicle 10B, and making arrangements for a parking location of the vehicle 10B and the authentication key of the vehicle 10B. The B2C car sharing management server 80 may also manage operations of a B2C trunk sharing service for lending the vehicle cabin or the trunk of the vehicle 10B as a temporary luggage storage or a delivery destination for a package.

The service management server 40 may include a company car management server instead of or in addition to the B2C car sharing management server 80. The company car management server operates a car sharing service (company car management service) that makes a reservation for use of the vehicle 10, that is a company car of a certain company, available with an employee of the company as a renter. At this time, when there is an idle time period of the vehicle 10 that is a company car, the C2C car sharing management server 70 may operate a C2C car sharing service that provides the vehicle 10 that is a company car for rent. The delivery management server 50 and the EC server 60 may operate a trunk delivery service that allows the trunk of the vehicle 10, which is a company car of a certain company, to be designated as a delivery destination for a package that is delivered to the company.

Details of Components Related to Locking and Unlocking and Starting Vehicle

Next, description will be given of the components related to locking and unlocking and start of the vehicle 10 in the authentication key management system 1 with reference to FIG. 2.

Figure 2:
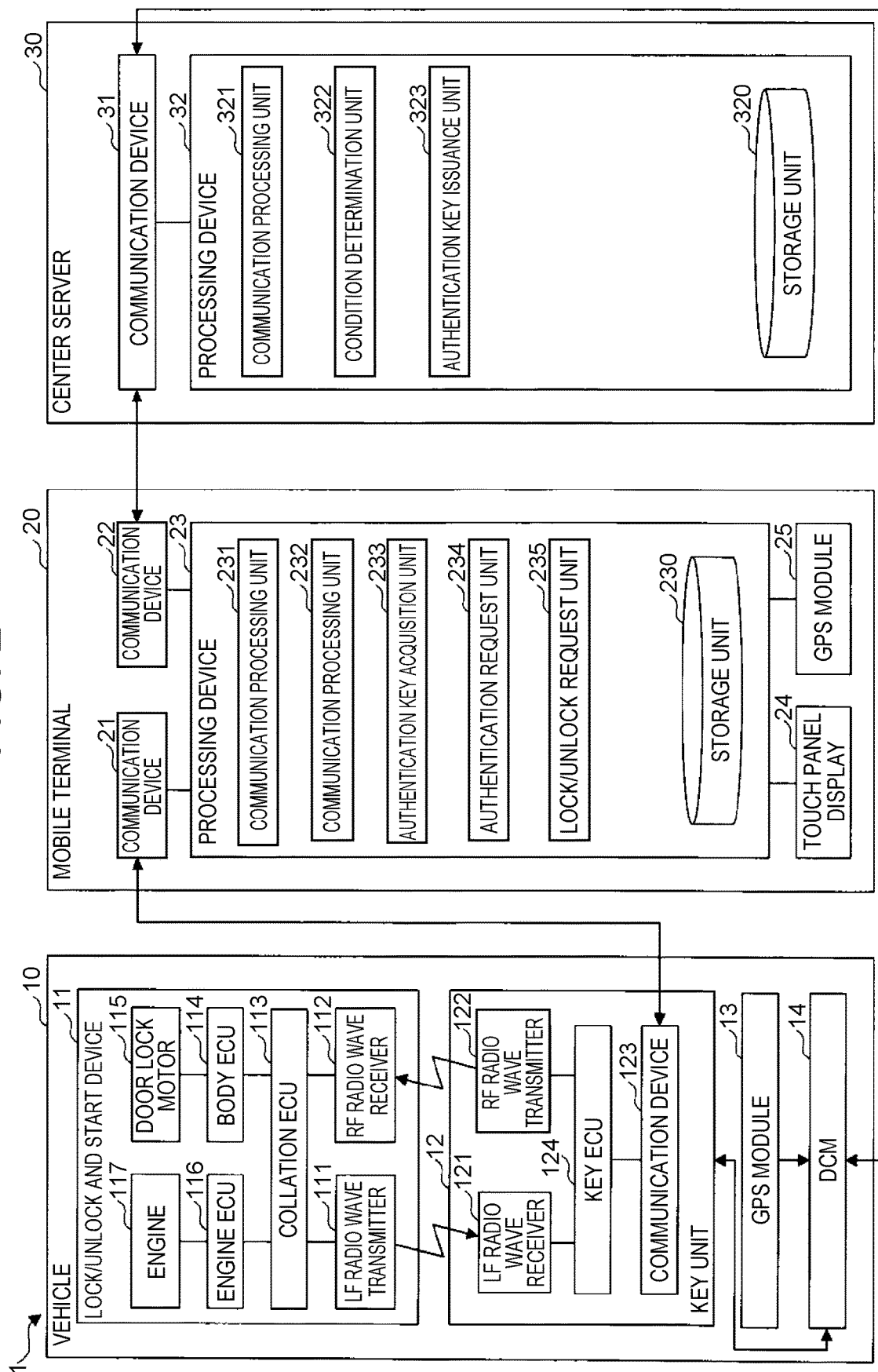
FIG. 2 mainly shows one example of the components related to locking and unlocking of a vehicle in the authentication key management system.

FIG. 2 mainly shows one example of the components related to locking and unlocking and starting the vehicle 10 in the authentication key management system 1. The vehicle 10 includes a lock/unlock and start device 11, a key unit 12, a GPS module 13, and a data communication module (DCM) 14.

The lock/unlock and start device 11 is mounted on the vehicle 10 to lock or unlock the doors of the vehicle 10 in response to a lock signal or unlock signal that is transmitted from the key unit 12 as radio frequency (RF)-band (for example, 300 MHz to 3 GHz) radio waves (hereinafter, referred to as RF radio waves). The lock/unlock and start device 11 starts the vehicle 10 in response to an exchange of low frequency (LF)-band (for example, 30 Hz to 300 kHz) radio waves (hereinafter, referred to as LF radio waves) and RF radio waves with the key unit, with use of a depressing operation of a start switch (not shown) provided in the vehicle cabin of the vehicle 10 as a trigger. The lock/unlock and start device 11 includes an LF radio wave transmitter 111, an RF radio wave receiver 112, a collation electronic control unit (ECU) 113, a body ECU 114, door lock motors 115, an engine ECU 116, and the engine 117 that is a driving force source of the vehicle 10.

The lock/unlock and start device 11 operates by electric power that is supplied from an auxiliary battery (not shown) mounted on the vehicle 10.

The LF radio wave transmitter 111 is incorporated in, for example, a center console or a door handle in the vehicle cabin, and transmits LF radio waves under control of the collation ECU 113.

The RF radio wave receiver 112 is provided in, for example, a trim in a luggage compartment of the vehicle 10, and receives RF radio waves under control of the collation ECU 113.

The collation ECU 113 is an electronic control unit that controls locking and unlocking of the doors of the vehicle 10 and start of the vehicle 10 based on an exchange of signals with the key unit 12. The collation ECU 113 is implemented by any hardware, software, or a combination thereof. For example, the collation ECU 113 is mainly formed of a microcomputer including a central processing unit (CPU), a random access memory (RAM), a read only memory (ROM), an auxiliary storage device, a real time clock (RTC), and a communication interface. The collation ECU 113 implements various control processes by executing various programs stored in the ROM or the auxiliary storage device on the CPU. Hereinafter, the same applies to a key ECU 124 described later.

The collation ECU 113 receives an unlock signal and a lock signal that are transmitted from the key unit 12 as RF radio waves with use of the RF radio wave receiver 112.

When the collation ECU 113 receives an unlock signal or a lock signal, the collation ECU 113 authenticates the transmission source (key unit 12) of the unlock signal or the lock signal based on key information (hereinafter, referred to as "internal key information") included in the unlock signal or the lock signal. For example, when internal key information that is registered in advance in an internal memory, such as the auxiliary storage device, matches the internal key information included in the unlock signal or the lock signal, the collation ECU 113 determines that authentication is successful. When those pieces of internal key information do not match each other, the collation ECU 113 determines that authentication is unsuccessful.

For example, the collation ECU 113 may transmit LF radio waves, including "challenge" generated by a specified method by utilizing the internal key information of the internal memory, from the LF radio wave transmitter 111 toward the key unit 12, and may perform challenge-response authentication based on "response" returned from the key unit 12 and received by the RF radio wave receiver 112.

When authentication is successful, the collation ECU 113 transmits an unlock command (upon reception of the unlock signal) or a lock command (upon reception of the lock signal) to the body ECU 114 through an in-vehicle network, such as a controller area network (CAN).

As described later, in the unlock signal, only one or some of the doors of the vehicle 10 may be designated as a door to be unlocked. In this case, the collation ECU 113 designates the door or doors to be unlocked in the unlock command. Thus, the body ECU 114 can unlock one or some of the doors by operating only the door lock motor or motors 115 corresponding to the designated door or doors.

When the start switch is depressed, the collation ECU 113 performs authentication of the key unit 12 by exchanging signals with the key unit 12 with use of the LF radio wave transmitter 111 and the RF radio wave receiver 112.

For example, the collation ECU 113 transmits from the LF radio wave transmitter 111 toward the key unit 12 an LF-band request signal for requesting a reply of the internal key information. When a response signal including the internal key information is received from the key unit 12 by the RF radio wave receiver 112, the collation ECU 113 determines whether authentication is successful or authentication is unsuccessful based on matching between the internal key information registered in the internal memory in advance and the internal key information included in the response signal, as in the case of locking or unlocking of the doors.

For example, the collation ECU 113 may also perform challenge-response authentication, as in the case of locking or unlocking of the doors.

When authentication is successful, the collation ECU 113 transmits a command to start up the engine 117 to the engine ECU 116 through the in-vehicle network, such as the CAN.

The body ECU 114 is an electronic control unit that controls operation of each of the door lock motors 115 that are communicably connected with the body ECU 114 via one-to-one communication lines, or the like. The body ECU 114 outputs a control command to cause the door lock motors 115 to perform an unlocking action in response to the unlock command from the collation ECU 113. The body ECU 114 also outputs a control command to cause the door lock motors 115 to perform a locking action in response to the lock command from the collation ECU 113.

The door lock motors 115 are known electric actuators that unlock or lock the doors of the vehicle 10 in response to a control command from the body ECU 114.

The engine ECU 116 is an electronic control unit that controls driving of the engine 117. Specifically, the engine ECU 116 controls driving of various actuators, such as a starter and an injector, mounted on the engine 117. When a start command is input from the collation ECU 113, the engine ECU 116 causes the engine 117 to start up by outputting a control command to the various actuators, such as the starter and the injector of the engine 117.

The key unit 12 is disposed in the vehicle cabin of the vehicle 10 to transmit one of the unlock signal and the lock signal as RF radio waves to the lock/unlock and start device 11 in response to a corresponding one of the unlock request and the lock request, which are transmitted from the mobile terminal 20. In addition, at the time when the start switch provided in the vehicle cabin of the vehicle 10 is depressed, the key unit 12 exchanges signals with the lock/unlock and start device 11 in response to an LF-band signal that is transmitted from the lock/unlock and start device 11. The key unit 12 includes an LF radio wave receiver 121, an RF radio wave transmitter 122, a communication device 123, and the key ECU 124.

The key unit 12 may be disposed at a location where the key unit 12 is difficult to be visually recognized by users seated on respective seats of the vehicle 10 (for example, inside a glove box or a center console box, or the like). The key unit 12 may be fixed to the vehicle 10 or may not be fixed. The key unit 12 may be operated by a built-in button battery, or the like, or may be operated by electric power that is supplied from the auxiliary battery mounted on the vehicle 10.

The LF radio wave receiver 121 receives LF radio waves under control of the key ECU 124.

The RF radio wave transmitter 122 transmits RF radio waves under control of the key ECU 124.

The communication device 123 is any device that carries out near-field communication with the mobile terminals 20 under control of the key ECU 124. The communication device 123 may be, for example, a Bluetooth (trademark) low energy (BLE) communication module that carries out communication with the mobile terminals 20 in conformity with the BLE communication standards. Hereinafter, description will be made on the assumption that the communication standards employed in the communication device 123 adhere to BLE communication.

The communication device 123 may be a communication device that adheres to close-range communication standards for a significantly short communicable range, such as near-field communication (NFC) standards. In this case, the communication device 123 may be incorporated at a location close to a body surface outside the vehicle cabin of the vehicle 10 (that is, for example, a location inside a door handle). Thus, even when a communicable range of the communication device 123 is significantly short, the key unit 12 (key ECU 124) can carry out communication with the mobile terminals 20 outside the cabin.

The key ECU 124 is an electronic control unit that executes a control process of transmitting one of a lock signal and an unlock signal to the lock/unlock and start device 11 in response to a corresponding one of a lock request and an unlock request, which is received from the mobile terminal 20.

The key ECU 124 controls the communication device 123 to establish the state that allows communication with the mobile terminal 20 in conformity to specified communication standards, that is, for example, BLE communication standards.

Specifically, the key ECU 124 transmits an advertising packet containing advertising information that can reach within a specified communication range (for example, several meters to tens of meters) from the communication device 123 on a periodic basis (for example, every several seconds). The advertising information includes a universally unique identifier (UUID), a device identifier (ID), and the like, corresponding to the key unit 12. Thus, the mobile terminal 20 can identify the key unit 12 mounted on the intended vehicle 10 as a result of receiving the advertising packet and confirming the advertising information.

When the key ECU 124 receives a connection request that requests a connection by the BLE communication from the mobile terminal 20 that has received the advertising packet and is present within the communication range of the vehicle 10 (key unit 12), the key ECU 124 establishes the state that enables BLE communication between the mobile terminal 20 and the vehicle 10 (key unit 12). At this time, the key ECU 124 transmits to the mobile terminal 20 a connection response notifying establishment of the BLE communication enabled state through the communication device 123.

In the above-stated BLE communication established state, the key ECU 124 also receives an authentication request including an authentication key associated with the key unit 12 from the mobile terminal 20 through the communication device 123.

When the authentication request including the authentication key associated with the key unit 12 is received from the mobile terminal 20, the key ECU 124 performs authentication of the mobile terminal 20 based on the authentication key. When the authentication is successful, the key ECU 124 reconstitutes the internal key information stored in the internal memory, such as the auxiliary storage device, into a usable state. The internal key information is stored in the state unusable for authentication in the lock/unlock and start device 11, such as an inaccessible state and an encrypted state. Accordingly, when authentication of the mobile terminal 20 is successful, the key ECU 124, for example, changes access authorization to access the internal memory for changing the key information into an accessible state, or decodes the encrypted internal key information based on the authentication key. Thus, the key ECU 124 can access the normally inaccessible internal key information so as to transmit an unlock signal or a lock signal, including the internal key information, to the lock/unlock and start device 11, or transmit an unlock signal or a lock signal, including the decoded internal key information, to the lock/unlock and start device 11. Therefore, the lock/unlock and start device 11 can perform appropriate authentication based on the internal key information included in the unlock signal or the lock signal. Even if a situation where a malicious third party illegally gets hold of the key unit 12 occurs, it is possible to suppress occurrence of a theft of the vehicle 10, since the internal key information in the key unit 12 is, for example, inaccessible or encrypted.

The key ECU 124 also receives an unlock request and a lock request from the mobile terminals 20 through the communication device 123 in the above-stated BLE communication established state. When authentication of the mobile terminal 20 is successful (specifically, the BLE communication established state is continuing after authentication of the mobile terminal 20 is successful), and the key ECU 124 receives an unlock request or a lock request from the mobile terminal 20, the key ECU 124 transmits an unlock signal or a lock signal, including locking or unlocking key information, to the lock/unlock and start device 11 through the RF radio wave transmitter 122.

Thus, after an authentication process in the lock/unlock and start device 11, unlocking or locking of the doors of the vehicle 10 is implemented.

As described above, at the time when the start switch provided in the vehicle cabin of the vehicle 10 is depressed, the key ECU 124 exchanges signals with the lock/unlock and start device 11 in response to an LF-band signal that is transmitted from the lock/unlock and start device 11.

For example, when the key ECU 124 receives the request signal from the lock/unlock and start device 11 by the LF radio wave receiver 121, the key ECU 124 transmits a response signal including the internal key information stored in the internal memory, or the like, toward the lock/unlock and start device 11 through the RF radio wave transmitter 122.

For example, when the LF radio wave receiver 121 receives LF radio waves including "challenge" from the lock/unlock and start device 11, the key ECU 124 generates "response" based on the internal key information, and transmits the "response" to the lock/unlock and start device 11 through the RF radio wave transmitter 122.

Thus, after the authentication process in the lock/unlock and start device 11, startup of the engine 117 is implemented.

The authentication key may define authorization assigned by the center server 30, the authorization being related to the function of locking or unlocking the vehicle 10 or starting the vehicle 10.

For example, when the authentication key has authorization to unlock only one or some of the doors of the vehicle 10, the key ECU 124 transmits an unlock signal, including information that designates the door or doors to be unlocked, to the key unit 12 through the RF radio wave transmitter 122. Thus, as described above, only one or some of the doors of the vehicle 10 may be unlocked.

For example, when the authentication key has no authorization to start the engine 117, the key ECU 124 may be configured not to exchange signals with the lock/unlock and start device 11 even when an LF-band signal from the lock/unlock and start device 11 based on a depressing operation of the start switch is received by the LF radio wave receiver 121. Thus, it is possible to prohibit start of the engine 117 in accordance with the authorization of the authentication key.

The GPS module 13 receives GPS signals that are transmitted from three or more, preferably four or more, satellites above the vehicle 10, and measures the location of the vehicle 10. The GPS module 13 is communicably connected with the DCM 14, or the like, through the in-vehicle network, such as a one-to-one communication line and the CAN. The measured location information on the vehicle 10 is input to the DCM 14, or the like.

The DCM 14 is a communication device that bidirectionally carries out communication with the center server 30 through a specified communication network. The DCM 14 transmits current location information on the vehicle 10, which is input from the GPS module 13, to the center server 30 at prescribed timing or in response to a request, or the like, from the center server 30. The DCM 14 transmits to the center server 30 various pieces of vehicle information (including information received from the key unit 12, such as the information indicating that the doors of the vehicle 10 are unlocked, or the vehicle 10 is started based on the authentication key) that can be acquired through the in-vehicle network, such as the CAN, at prescribed timing or in response to a request, or the like, from the center server 30.

The mobile terminals 20 include a communication device 21, a communication device 22, a processing device 23, a touch panel display (hereinafter, simply referred to as "display") 24, and a GPS module 25.

The communication device 21 is any device that carries out near-field communication with the vehicle 10 in accordance with the same communication standards as the communication device 123. As described above, the communication device 21 is, for example, a BLE communication module in the case of the present embodiment.

The communication device 22 is any device that carries out communication with the center server 30, the service management server 40, and the like, through a specified communication network. The communication device 22 is, for example, a mobile communication module that conforms to communication standards, such as long term evolution (LTE), 4th generation (4G), and 5th generation (5G).

The processing device 23 executes various control processes in the mobile terminal 20. The functions of the processing device 23 may be implemented by hardware, software, or a combination of hardware and software. The processing device 23 includes, for example, a CPU, a RAM, a ROM, an auxiliary storage device, an RTC, various interfaces for communication, and the like. The processing device 23 includes, for example, a communication processing unit 231, a communication processing unit 232, an authentication key acquisition unit 233, an authentication request unit 234, and a lock/unlock request unit 235, as functional units that are implemented by executing one or more programs stored in the ROM or the auxiliary storage device on the CPU. The processing device 23 also includes, for example, a storage unit 230 that is implemented as a storage area in the auxiliary storage device. The process of saving (storing) various data in the storage unit 230 is implemented by a specified program stored in the ROM or the auxiliary storage device.

The communication processing unit 231 bidirectionally carries out near-field communication with the key unit 12 with use of the communication device 21, and transmits or receives various signals.

The communication processing unit 232 establishes connection with a specified communication network with use of the communication device 22, and transmits or receives various signals, such as data signals and control signals, with the center server 30, the service management server 40, and the like.

For example, the authentication key acquisition unit 233 acquires an authentication key from the center server 30, and saves the acquired authentication key in the storage unit 230 in response to a specified operation of the user to a specified graphical user interface (GUI) that is displayed on the display 24. Hereinafter, description will be made on the assumption that various operations to the mobile terminal 20 are made by operations to the GUI that is displayed on the display 24 in conjunction with the operation of the key application.

For example, the authentication key acquisition unit 233 of the mobile terminal 20Aa transmits an authentication key acquisition request to the center server 30 via the communication processing unit 232. Consequently, the center server 30 receives the authentication key acquisition request, and when determining that the authentication key acquisition request is a legal authentication key acquisition request, the center server 30 issues an authentication key. The authentication key acquisition unit 233 then acquires the authentication key that is distributed from the center server 30 via the communication processing unit 232.

For example, the authentication key acquisition unit 233 of the mobile terminal 20Ab also acquires, via the communication processing unit 232, an authentication key that is distributed from the center server 30 to the mobile terminal 20Ab in response to a key sharing request (described later) that is transmitted from the mobile terminal 20Aa to the center server 30.

The authentication key acquisition unit 233 of the mobile terminal 20Ab by itself may transmit an authentication key acquisition request to the center server 30 via the communication processing unit 232. In this case, when the center server 30 receives an authentication key acquisition request from the mobile terminal 20Ab, the center server 30 may make an inquiry to the mobile terminal 20Aa of the owner user about whether or not to allow delivery of the authentication key.

For example, the authentication key acquisition units 233 of the mobile terminals 20Ac, 20Ad, 20B each transmit an authentication key acquisition request to acquire an authentication key to the delivery management server 50, the C2C car sharing management server 70, and the B2C car sharing management server 80. Thus, each of the delivery management server 50, the C2C car sharing management server 70, and the B2C car sharing management server 80 transmits an authentication key arrangement request to the center server 30 in response to reception of the authentication key acquisition request, and the center server 30 issues an authentication key in response to reception of each of the authentication key arrangement requests. The authentication key acquisition units 233 then each acquire an authentication key that is distributed from the center server 30 via the communication processing unit 232.

The authentication key acquisition unit 233 of each of the mobile terminals 20Ac, 20Ad, 20B may transmit an authentication key acquisition request to the center server 30 through the communication processing unit 232. In this case, the center server 30 may determine whether or not the authentication key acquisition request is a legal authentication key acquisition request by making an inquiry to a corresponding one of the delivery management server 50, the C2C car sharing management server 70, and the B2C car sharing management server 80.

The authentication request unit 234 transmits to the key unit 12 of the vehicle 10 an authentication request to authenticate the mobile terminal 20 serving as a remote operating unit for locking or unlocking the doors of the vehicle 10 via the communication processing unit 231. For example, when the authentication request unit 234 finds a key unit corresponding to the authentication key, specifically, when the communication processing unit 231 receives an advertising packet corresponding to the key unit 12, the authentication request unit 234 may transmit an authentication request to the key unit 12. For example, the authentication request unit 234 may also transmit an authentication request to the key unit 12 in response to a specified operation of the user.

The lock/unlock request unit 235 transmits an unlock request including an authentication key or a lock request including an authentication key to the key unit 12 via the communication processing unit 231 in response to a specified operation of the user. Thus, even when an unlock request or a lock request is transmitted to the key unit 12 before the authentication request unit 234 transmits an authentication request, the doors of the vehicle 10 may be locked or unlocked based on the authentication process in the key unit 12. For example, the GUI that is an operation screen of the display 24 may contain an unlock button for issuing a request to unlock the vehicle 10 and a lock button for issuing a request to lock the vehicle 10. A lock request may be transmitted with the touch of the lock button, whereas an unlock request may be transmitted with the touch of the unlock button. The lock request and the unlock request may be transmitted as a result of an operation to a specified hardware operating unit provided in the mobile terminal 20.

For example, the functions of the authentication key acquisition unit 233, the authentication request unit 234, and the lock/unlock request unit 235 may be configured to be available to the user by activating a specified application program that is installed on the ROM, the auxiliary storage device, or the like, of the processing device 23. Hereinafter, description will be made on the assumption that the functions of the authentication key acquisition unit 233, the authentication request unit 234, and the lock/unlock request unit 235 of the processing device 23 become available to the user by activating the key application installed on the processing device 23 (the auxiliary storage device or the ROM).

For example, the display 24 is a liquid crystal display or an organic electro luminescence (EL) display. The display 24 is a display device provided on the front face of the mobile terminal 20 to serve also as a known touch-sensitive operation unit.

The GPS module 25 receives GPS signals that are transmitted from three or more, preferably four or more, satellites above the mobile terminal 20, and measures the location of the mobile terminal 20. The positioning information (location information on the mobile terminal 20) by the GPS module 25 is taken into the processing device 32.

The mobile terminal 20 may position the location of the mobile terminal 20 by base station positioning based on the wireless communication with a plurality of base stations.

The center server 30 includes a communication device 31 and a processing device 32.

The functions of the center server 30 may be implemented by a plurality of servers in a distributed manner. Hereinafter, this also applies to the delivery management server 50, the EC server 60, the C2C car sharing management server 70, and the B2C car sharing management server 80.

The communication device 31 is any device that bidirectionally carries out communication with each of the vehicles 10, the mobile terminals 20, and the service management server 40 through a specified communication network.

The processing device 32 performs various control processes in the center server 30. The functions of the processing device 32 may be implemented by hardware, software, or a combination of hardware and software. The processing device 32 is mainly formed of one or a plurality of server computers each including, for example, a CPU, a RAM, a ROM, an auxiliary storage device, an RTC, a specified communication interface, and the like. Hereinafter, this also applies to a processing device 52 of the delivery management server 50, a processing device 62 of the EC server 60, a processing device 72 of the C2C car sharing management server 70, and a processing device 82 of the B2C car sharing management server 80 described later. The processing device 32 includes, for example, a communication processing unit 321, a condition determination unit 322, and an authentication key issuance unit 323 as functional units that are implemented by executing one or more programs saved in the ROM or the auxiliary storage device on the CPU. The processing device 32 also includes, for example, a storage unit 320 that is implemented as a storage area defined in a storage device, such as an auxiliary storage device of a corresponding server computer, and an external storage device that is connected with the corresponding server computer. A process of saving (storing) various data in the storage unit 320 is implemented by a program stored in the ROM or the auxiliary storage device. Hereinafter, the same applies to storage units, 520, 620, 720, 820 described later.

The communication processing unit 321 controls the communication device 31, and exchanges various signals, such as control signals and information signals, with each of the vehicles 10, the mobile terminals 20, and the service management server 40.

The condition determination unit 322 determines whether an authentication key acquisition request or an authentication key arrangement request is a legal request in response to reception of an authentication key acquisition request from one of the mobile terminals 20 or an authentication key arrangement request from the service management server 40, received by the communication processing unit 321.

When the condition determination unit 322 determines that the authentication key acquisition request or the authentication key arrangement request is a legal request, the authentication key issuance unit 323 identifies the specifications of an authentication key to be issued, and issues an authentication key corresponding to the identified specifications. For example, the authentication key issuance unit 323 identifies the vehicle 10 intended to be locked or unlocked with the authentication key or identifies the key unit 12, or the like, corresponding to the intended vehicle 10. For example, the authentication key issuance unit 323 also identifies the authorization of the authentication key related to an effective (available) period of the authentication key and the number of times the authentication key is available. For example, the authentication key issuance unit 323 also identifies the authorization of the authentication key for unlocking the vehicle 10 or starting the vehicle 10, such as which door can be locked or unlocked, and whether or not the vehicle 10 can be started. For example, the authentication key issuance unit 323 also identifies the authorization of the authentication key related to later-described temporary key sharing, such as whether the authentication key can be shared with another one of the mobile terminals 20 through the temporary key sharing, a period during which the authentication key can be shared with another one of the mobile terminals 20, and the number of times the authentication key can be shared with another one of the mobile terminals 20. Hereinafter, the authorization of the authentication key related to an available period, an available number of times, and the like, the authorization of the authentication key for unlocking the vehicle 10 or activating the vehicle 10, and the authorization of the authentication key related to temporary key sharing are collectively and simply referred to as "various types of authorization of the authentication key." The authentication key issuance unit 323 distributes the authentication key issued for the intended mobile terminal 20 via the communication processing unit 321.

Details of Components Related to Key Sharing Service

Next, components related to the key sharing service in the authentication key management system 1 will be described with reference to FIG. 3.

Figure 3:
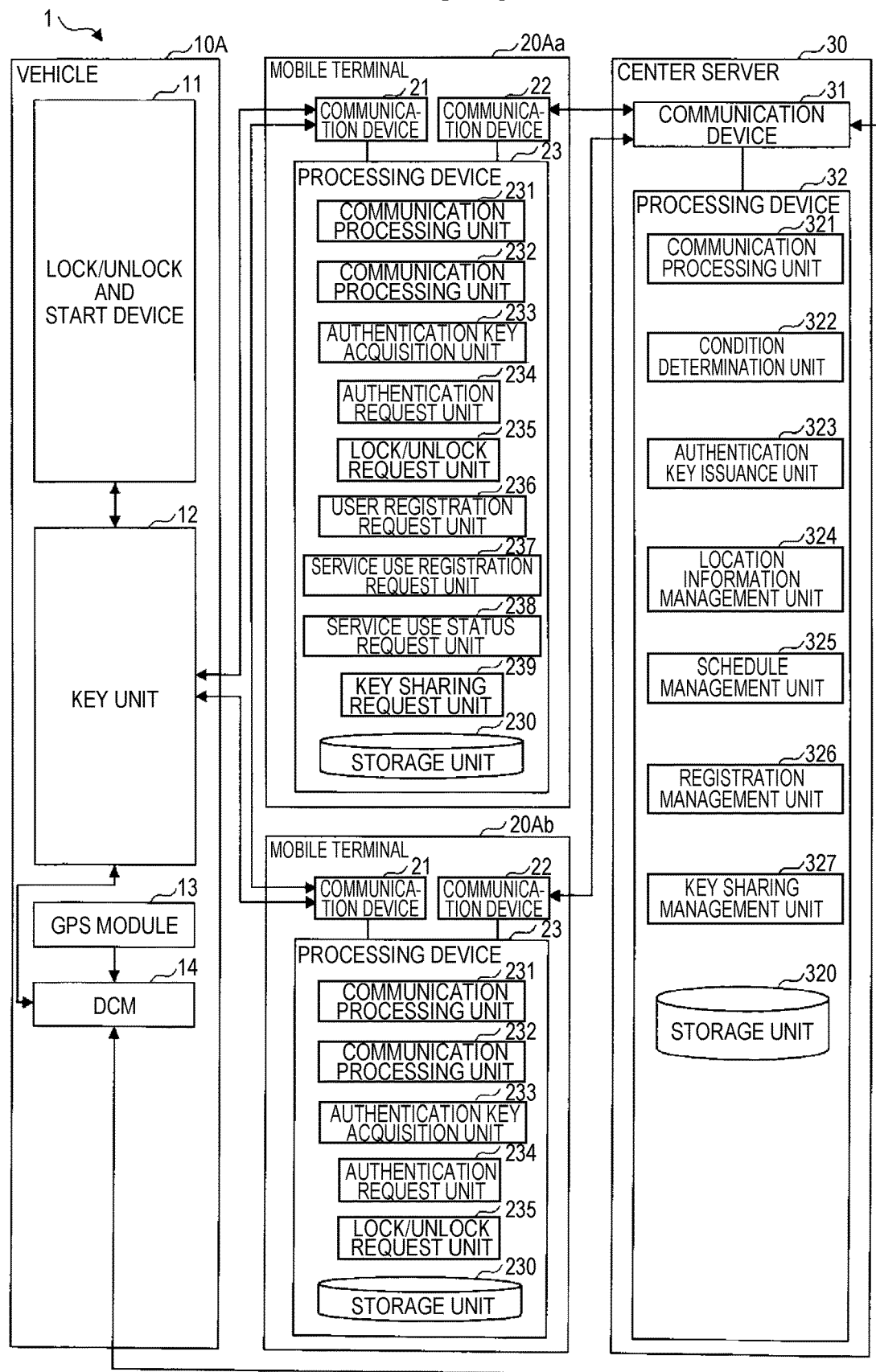
FIG. 3 mainly shows one example of the components related to a key sharing service in the authentication key management system.

FIG. 3 mainly shows one example of the components related to the key sharing service in the authentication key management system 1. Hereinafter, for FIG. 3, the components related to the key sharing service in the authentication key management system 1 will be mainly described, and the overlapped description of the components that overlap with the above-described components related to locking and unlocking of the vehicle 10 and start of the vehicle 10 is omitted as much as possible. Hereinafter, the same applies to the description of FIGS. 4 to 6.

As described above, the processing device 23 of the mobile terminal 20Aa carried by the owner user of the vehicle 10A includes the communication processing unit 231, the communication processing unit 232, the authentication key acquisition unit 233, the authentication request unit 234, and the lock/unlock request unit 235. The processing device 23 of the mobile terminal 20Aa further includes a user registration request unit 236, a service use registration request unit 237, a service use status request unit 238, and a key sharing request unit 239 as functional units that are implemented by executing one or more programs stored in the ROM or the auxiliary storage device on the CPU.

In the present embodiment, description will be made on the assumption that the functions of the user registration request unit 236, the service use registration request unit 237, the service use status request unit 238, and the key sharing request unit 239 of the mobile terminal 20Aa become available to the owner user when the key application is activated, and user authentication based on bidirectional communication with the center server 30 is successful. Description will also be made on the assumption that the user authentication is performed on the center server 30 based on an ID prescribed for the owner user (hereinafter, referred to as owner user ID) and a password corresponding to the owner user ID.

The user registration request unit 236 requests registration of a regular user of the vehicle 10A, who uses various services using the vehicle 10A (the key sharing service, the trunk delivery service, and the C2C car sharing service), to the center server 30 in response to a specified operation of the owner user. For example, the user registration request unit 236 transmits a user registration request including the owner user ID, the password, and attribute information that identifies a child user to be registered (for example, a name, an age, a relation with the owner user, and the like) to the center server 30 via the communication processing unit 232.

When the communication processing unit 232 receives a notification that registration of the child user is completed (user registration completion notification) from the center server 30, the user registration request unit 236 saves an ID of the child user (hereinafter, referred to as "child user ID") and a password, included in the user registration completion notification, in the storage unit 230. At this time, the user registration request unit 236 may transmit the child user ID and the password to the mobile terminal 20Ab carried by the registered child user via the communication processing unit 231 in response to a specified operation of the owner user.

The service use registration request unit 237 requests use registration of various services using the vehicle 10A by a regular user of the vehicle 10A to the center server 30 in response to a specified operation of the owner user. That is, as described above, the service use registration request unit 237 requests registration of authentication key arrangement authorization of the key sharing management unit 327 and the service management server 40 corresponding to various services, for the regular user of the vehicle 10A to use various services. For example, the service use registration request unit 237 transmits a service use registration request including the owner user ID, the password of the owner user ID, information that identifies the vehicle 10A used in various services, information that identifies an intended service, and the ID (the owner user ID or the child user ID) of the regular user who uses the intended service to the center server 30 via the communication processing unit 232. Hereinafter, the owner user ID and the child user ID may collectively be referred to as "regular user IDs". Thus, the service use registration request unit 237 can register a child user who uses the key sharing service with the center server 30.

The service use registration request unit 237 receives, from at least one of the center server 30 and the service management server 40, a notification that the use registration of a service based on the service use registration request is completed with the use of the communication processing unit 232. The service use registration request unit 237 causes the display 24 to display the fact that the use registration of a specific service to be used by the regular user of the vehicle 10A based on a specified operation of the owner user is completed. Thus, the owner user may be informed of the fact that the use registration of the specific service to be used by the regular user is completed.

The service use status request unit 238 requests information (service use status information) related to the use statuses of various services, including the key sharing service, used by the regular user of the vehicle 10A who is already registered in association with the owner user ID, to the center server 30 in response to a specified operation of the owner user. For example, the service use status request unit 238 transmits a service use status request including the owner user ID and the password to the center server 30 via the communication processing unit 232. When the communication processing unit 232 receives the service use status information from the center server 30, the service use status request unit 238 displays the service use status information on the display 24. Thus, the owner user can see, in an integrated fashion, information related to the use statuses of various services to be used by the regular users registered in the center server 30 in association with the owner user ID.

The key sharing request unit 239 requests to the center server 30 distribution of an authentication key for locking and unlocking or starting the vehicle 10A to the child user registered for use with the key sharing service, in response to a specified operation of the owner user. For example, the key sharing request unit 239 transmits to the center server 30 a key sharing request including the owner user ID and the password of the owner user ID, information that identifies the vehicle 10A to be locked or unlocked with use of the authentication key, and information (for example, the child user ID) that identifies the child user intended to receive (share) an authentication key, via the communication processing unit 232. At this time, the key sharing request may include use period information related to an available period of the authentication key to be distributed (for example, use start date and time, use end date and time, or the like), which is set by a specified operation of the owner user. The key sharing request may also include authorization information related to various types of authorization of an authentication key, including the authorization of an authentication key on an available period, an available number of times, or the like, the authorization of an authentication key for unlocking the vehicle or starting the vehicle, and the authorization of an authentication key on temporary key sharing described later, which may be designated in response to a specified operation of the owner user. Thus, as described later, when an authentication key available at a certain period is shared among the plurality of mobile terminals 20, it becomes possible to limit usage of the vehicle 10A by users other than the owner user by the owner user properly setting authorization information. This makes it possible to improve the security of the vehicle 10A.

The key sharing request unit 239 may request to the center server 30 distribution of authentication keys having their available periods overlapped with each other to the mobile terminals 20 (that is, at least one of the mobile terminals 20Aa, 20Ab) of the plurality of regular users of the vehicle 10A in response to a specified operation of the owner user. That is, in the key sharing request, the plurality of regular users may be designated as authentication key distribution targets, and the plurality of regular users may include the owner user. In the key sharing request, the available periods of authentication keys distributed for the plurality of designated regular users may be overlapped with each other. Thus, an authentication key of the vehicle 10A available at the same time may be shared among the plurality of regular users. For this reason, for example, when two or more persons get on the vehicle 10A and go on a trip or go camping, each of the passengers can, for example, lock or unlock the vehicle 10A without lending or borrowing the mobile terminal 20 in which the authentication key is saved. This makes it possible to improve the convenience of the users.

The key sharing request unit 239 may share the already distributed authentication key with another one of the mobile terminals 20 (that is, the mobile terminal 20 onto which the key application is installed) in response to a specified operation of the owner user (hereinafter, the mode of sharing the authentication key is referred to as "temporary key sharing"). At this time, the other one of the mobile terminals 20 may be the mobile terminal 20Ab of the child user or may be the mobile terminal 20 of a user other than the child user, that is, a user who temporarily uses the vehicle 10A.

For example, the key sharing request unit 239 transmits the authentication key (specifically, a copy of the authentication key) to another one of the mobile terminals 20 through the communication processing unit 231. Thus, even when two or more persons suddenly decide to get on the vehicle 10A to go on a trip, or the like, the owner user of the vehicle 10A can share the authentication key with another user. It is also possible to share the authentication key available at the same time directly from the mobile terminal 20Aa to another one of the mobile terminals 20. Accordingly, for example, even when the mobile terminal 20Aa is located in a place of a poor communication condition in a wireless mobile communication network or outside a communication range, the owner user of the vehicle 10A can share the authentication key with another user.

At this time, the key sharing request unit 239 may transmit an authentication key to another one of the mobile terminals 20 through the communication processing unit 231, the authentication key having limited authorization on an available period or an available number of times or limited authorization for unlocking or starting the vehicle 10A, set based on a specified operation of the owner user or prescribed in advance. Specifically, for example, an authentication key provided with authorization that limits an available period to 30 minutes, or the like, or that limits the available number of times to once, or the like, or an authentication key provided with authorization that limits the doors to be locked or unlocked to entrance doors of the vehicle 10A, or that prohibits starting of the vehicle 10A may be transmitted to another one of the mobile terminals 20. Hereinafter, this also applies to the case of temporary key sharing that is performed via the center server 30. Thus, it is possible to improve the security of the vehicle 10A in temporary key sharing.

When temporary key sharing is performed, the key sharing request unit 239 may cause the center server 30 to distribute an authentication key to another one of the mobile terminals 20 as in the case of normal key sharing. At this time, the key sharing request unit 239 may cause the center server 30 to distribute the authentication key of the vehicle 10A to another one of the mobile terminals 20 by transmitting a temporary key sharing request, including information that identifies the distributed authentication key (for example, an issued ID embedded in the authentication key, or the like) and information that designates the other one of the mobile terminals 20 as a distribution target, to the center server 30 through the communication processing unit 232.

For example, when the other one of the mobile terminals 20 is the mobile terminal 20Ab of the child user, the key sharing request unit 239 may transmit a temporary key sharing request including the child user ID to the center server 30 through the communication processing unit 232.

For example, the key sharing request unit 239 also acquires specified identification information (for example, a QR code (registered trademark) corresponding to the user of another one of the mobile terminals 20, who is registered in the center server 30 as an installed user of the key application) from the other one of the mobile terminals 20 through the communication processing unit 231, or the like. Then, the key sharing request unit 239 may transmit a temporary key sharing request that designates the other one of the mobile terminals 20, which is identified based on the identification information, as a distribution target to the center server 30.

The mobile terminal 20Aa may acquire the identification information with another method. For example, the mobile terminal 20Aa may acquire identification information corresponding to the user of another one of the mobile terminals 20 such that the identification information displayed on the display 24 of the other one of the mobile terminals 20 is recognized with use of the function of an on-board camera. For example, the mobile terminal 20Aa may also acquire the identification information transmitted to the mail address or the SNS account of the owner user from the user of the other one of the mobile terminals 20.

For example, the key sharing request unit 239 also transmits a candidate terminal information request that requests candidate terminal information related to a candidate terminal or terminals that are candidates of another one of the mobile terminals 20 located around the current location of the mobile terminal 20Aa, to the center server 30 through the communication processing unit 232 in response to a specified operation of the owner user. When the communication processing unit 232 receives the candidate terminal information from the center server 30, the key sharing request unit 239 also causes the display 24 to display the candidate terminal information. At this time, the candidate terminal information that is returned from the center server 30 may include information that identifies a candidate terminal, on which a specific operation or action is being performed, among the candidate terminals. Thus, when the user of another one of the mobile terminals 20, intended for key sharing, performs a specific operation or action on the other one of the mobile terminals 20, the owner user of the vehicle 10A can identify the other one of the mobile terminals 20, out of the candidate terminals that are displayed on the display 24 of the mobile terminal 20Aa. The key sharing request unit 239 may transmit a temporary key sharing request that designates, as a distribution target, the other one of the mobile terminals 20 identified out of the candidate terminals, to the center server 30 in response to a specified operation of the owner user.

The key sharing request unit 239 may also activate the key application, and transmit link information based on a uniform resource locator (URL) scheme (hereinafter, simply referred to as "link information") for causing another one of the mobile terminals 20 to acquire an authentication key from the center server 30, to the mail address or SNS account of the user of the other one of the mobile terminals 20 through the communication processing unit 232, in response to a specified operation of the owner user. At this time, the key sharing request unit 239 transmits a temporary key sharing request that designates an acquired authentication key, to the center server 30 through the communication processing unit 232, in response to a specified operation of the owner user, and acquires link information that is returned from the center server 30 in response to the temporary key sharing request. Thus, the key sharing request unit 239 can distribute an authentication key from the center server 30 to another one of the mobile terminals 20.

Temporary key sharing may be configured to be executable from the mobile terminal 20Ab of the child user, to which the authentication key has already been distributed. That is, the functions of the key sharing request unit 239, related to temporary key sharing, may be included in the functions of the key application that is installed onto the processing device 23 of the mobile terminal 20Ab of the child user. Thus, even in the case where two or more persons except the owner user get on the vehicle 10A, it is not necessary to lend or borrow the mobile terminal 20Ab of the child user who has already acquired the authentication key, among the two or more persons. This makes it possible to further improve the convenience of the child user of the vehicle 10A. Hereinafter, description will be made on the assumption that temporary key sharing is usable from the mobile terminal 20Ab of the child user.

As described above, the processing device 32 of the center server 30 includes the communication processing unit 321, the condition determination unit 322, the authentication key issuance unit 323, and the storage unit 320. The processing device 32 of the center server 30 also includes, as a functional unit implemented by, for example, executing one or more programs stored in an auxiliary storage device of the server computer, or the like on the CPU, a location information management unit 324, a schedule management unit 325, a registration management unit 326, and the key sharing management unit 327.

When the communication processing unit 321 receives an authentication key acquisition request from one of the mobile terminals 20Aa, 20Ab, the condition determination unit 322 performs authentication based on the regular user ID and the password included in the authentication key acquisition request. For example, the condition determination unit 322 compares the regular user ID and the password registered in the storage unit 320 with the regular user ID and the password included in the authentication key acquisition request. When the registered regular user IDs and the passwords match each other, the condition determination unit 322 determines that authentication is successful, that is, the authentication key acquisition request is a legal authentication key acquisition request.

The condition determination unit 322 also determines whether or not an authentication key arrangement request that is sent from the key sharing management unit 327 described later is a legal authentication key arrangement request. For example, when authentication is successful based on authentication information (for example, the ID and the password) included in the authentication key arrangement request from the key sharing management unit 327, the condition determination unit 322 may determine that the authentication key arrangement request is a legal authentication key arrangement request.

When the condition determination unit 322 determines that the authentication key acquisition request or the authentication key arrangement request is a legal request, the authentication key issuance unit 323 issues an authentication key, and distributes the authentication key to the intended mobile terminal 20 through the communication processing unit 321.

The location information management unit 324 manages the location information on the vehicles 10 (10A, 10B). Specifically, the location information management unit 324 transmits a location information request to the vehicles 10 through the communication processing unit 321. Thus, in response to the location information request, the DCM 14 of each of the vehicle 10 returns the location information on the vehicle 10, input from the GPS module 13, to the center server 30. Accordingly, the location information management unit 324 can acquire the location information on the vehicles 10.

For example, the location information management unit 324 acquires location information from the vehicle 10A via the communication processing unit 321, and keeps track of a travel status of the vehicle 10A by monitoring the location information on the vehicle 10A in real time. Thus, for example, the location information management unit 324 can inform the owner user of the location information on the vehicle 10A that is lent to the child user, via the communication processing unit 321. For example, the location information management unit 324 can inform the mobile terminal 20Ab of the child user of the information, such as whether the vehicle 10A scheduled to be lent to the child user is heading toward a designated location (user's residence, or the like), or how long it takes to get to the designated location, via the communication processing unit 321.

The schedule management unit 325 manages the use statuses of the vehicle 10A in various services. For example, the schedule management unit 325 periodically acquires from the key sharing management unit 327 information related to a use schedule of the vehicle 10A in the key sharing service, specifically, an available date and time of the authentication key that is distributed by the key sharing service. The schedule management unit 325 also acquires a use schedule of the vehicle 10A in the trunk delivery service from the delivery management server 50 and a use schedule of the vehicle 10A in the C2C car sharing service from the C2C car sharing management server 70, via the communication processing unit 321. The schedule management unit 325 generates information related to a use schedules of the vehicle 10A (vehicle use schedule information) over a plurality of services based on the acquired use schedules of the vehicle 10A in the various services, and updates old vehicle use schedule information saved in the storage unit 320.

The registration management unit 326 registers a regular user (child user) who uses various services, in response to a user registration request that is received from the mobile terminal 20Aa of the owner user by the communication processing unit 321. For example, the registration management unit 326 compares the owner user ID and the password included in the user registration request from the mobile terminal 20Aa with the owner user ID and the password saved in the storage unit 320. When the owner user IDs and the passwords match each other, the registration management unit 326 determines that the user registration request is a legal user registration request, that is, authentication is successful. The registration management unit 326 then registers the child user ID, included in the legal user registration request, with a user and service registration information database (DB) in the storage unit 320 as a regular user who can use various services.

The registration management unit 326 performs use registration of various services used by the regular user of the vehicle 10A in response to a service use registration request that is received from the mobile terminal 20Aa of the owner user by the communication processing unit 321. That is, in response to the service use registration request, the registration management unit 326 registers authentication key arrangement authorization of the key sharing management unit 327 and the service management server 40 corresponding to various services for the user of the vehicle 10A to use the various services. For example, the registration management unit 326 determines whether or not the service use registration request is a legal service use registration request by executing an authentication process similar to the above-described process based on the owner user ID and the password included in the service use registration request from the mobile terminal 20Aa. When the service use registration request is a legal service use registration request, the registration management unit 326 also determines whether or not the regular user ID included in the service use registration request is already registered with the user and service registration information DB. When the regular user ID included in the service use registration request is already registered with the user and service registration information DB, the registration management unit 326 registers an intended service, which is identified by the service use registration request, with the user and service registration information DB in the storage unit 320 as a service available to the regular user corresponding to the regular user ID.

Specifically, the registration management unit 326 constructs the user and service registration information DB configured such that the owner user ID is associated with service unique information that identifies an intended service, vehicle unique information that identifies the vehicle 10A, the regular user ID that identifies the regular user who uses the intended service, and service link information that associates the vehicle unique information and the regular user ID, corresponding to the vehicle 10A, with the intended service.

The service unique information is, for example, a service ID that is defined for each service. Specifically, for example, when there is a plurality of companies that provide the C2C car sharing service, a service ID unique to each of the companies is defined. For example, when the same company provides a plurality of C2C car sharing services, a unique ID is defined for each of the services provided by the same company. When the trunk delivery service is provided by combinations between a plurality of delivery companies and a plurality of EC companies, a unique service ID may be defined for each combination of delivery companies and EC companies. Alternatively, an intended service may be identified by a combination of a unique service ID that is defined for each of the plurality of delivery companies and a unique service ID that is defined for each of the plurality of EC companies.

The vehicle unique information may be any information as long as the vehicle unique information can identify the vehicle 10A to be locked or unlocked or to be started with an authentication key. The vehicle unique information may be, for example, identification information, such as a vehicle ID and a VIN, that is defined for each vehicle 10A, or may be, for example, identification information, such as a key unit ID, that is defined for each on-board device mounted on the vehicle 10A, such as the key unit 12, and related to locking or unlocking the doors or starting the vehicle 10A based on an authentication key. Hereinafter, description will be made on the assumption that the vehicle unique information is a key unit ID.

The service link information is information that is required to cause the authentication key issuance unit 323 to issue an authentication key and distribute the authentication key to the intended mobile terminal 20, when any one of the key sharing management unit 327, the delivery management server 50, the EC server 60, and the C2C car sharing management server 70 that manage corresponding various services transmits an authentication key arrangement request. That is, the authentication key issuance unit 323 can identify the vehicle 10A to be locked or unlocked or to be started with an authentication key and issue an appropriate authentication key, upon acceptance of an authentication key arrangement request including service link information from any one of the key sharing management unit 327, the delivery management server 50, the EC server 60, and the C2C car sharing management server 70.

The service link information may be any information as long as the service link information can associate an intended service with the vehicle 10A and a user who uses the service in the center server 30. Examples of the service link information may include a login ID (hereinafter, referred to as "service login ID" for the sake of convenience) of a regular user on each of user-oriented websites for various services corresponding to the key sharing management unit 327, the delivery management server 50, the EC server 60, and the C2C car sharing management server 70. In this case, the service use registration request unit 237 of the mobile terminal 20Aa transmits a service use registration request including the service login IDs of a regular user to be registered, corresponding to various services, to the center server 30 via the communication processing unit 232. When a regular user to be registered does not yet acquire service login IDs corresponding to various services, the processing device 23 of the mobile terminal 20Aa may activate a specified browser and cause the regular user to acquire service login IDs of websites for the various services. Thus, when a user (a regular user of the vehicle 10A) logs onto a website at the time of requesting an intended service, the delivery management server 50 or the C2C car sharing management server 70 can find a service login ID corresponding to the service link information and easily arrange for an authentication key related to provision of the service. Hereinafter, description will be made on the assumption that the service link information related to the trunk delivery service and the C2C car sharing service is the above-described service login ID.

When a regular user regularly uses the plurality of vehicles 10A, the center server 30 can identify the regular user but cannot identify the vehicle 10A with only the service login ID. For this reason, the service link information includes not only a service login ID but also information for indirectly identifying the vehicle 10A (for example, information obtained by encrypting vehicle unique information in a specified manner, or the like).

When use registration of various services is completed, the registration management unit 326 provides a notification of the completion to the mobile terminal 20Aa or 20Ab, corresponding to a regular user to be registered, via the communication processing unit 321. When use registration of various services is completed, the registration management unit 326 also provides a service use registration completion notification including service link information to any one of the key sharing management unit 327 and the service management server 40, which manage operations of the registered service.

A notification notifying completion of use registration of various services may be transmitted to the mobile terminal 20Aa or 20Ab from the service management server 40, which has received the service use registration completion notification.

When the communication processing unit 321 receives a service use status request from the mobile terminal 20Aa, the registration management unit 326 generates service use status information based on the user and service registration information DB of the storage unit 320, the vehicle use schedule information that is managed by the schedule management unit 325, and the like, and distributes the service use status information to the mobile terminal 20Aa via the communication processing unit 321.

The key sharing management unit 327 manages operations of the key sharing service.

For example, in response to the key sharing request that is received from the mobile terminal 20Aa of the owner user by the communication processing unit 321, the key sharing management unit 327 arranges for an authentication key to the mobile terminal 20Aa or 20Ab corresponding to a regular user ID designated by the key sharing request. Specifically, the key sharing management unit 327 compares the owner user ID and the password included in the key sharing request with the owner user ID and the password saved in the storage unit 320. When the owner user IDs and the passwords match each other, the key sharing management unit 327 determines that the key sharing request is a legal key sharing request. The key sharing management unit 327 also makes an inquiry to the schedule management unit 325, and determines whether there is inconsistency between use period information included in the key sharing request and the latest vehicle use schedule information, that is, whether there are overlapped date and time related to usage of the vehicle 10A among a plurality of services and a plurality of regular users. When there are no overlapped date and time, the key sharing management unit 327 sends an authentication key arrangement request to the authentication key issuance unit 323. The authentication key arrangement request includes information related to a regular user corresponding to the mobile terminal 20Aa or 20Ab, which is a distribution target of an authentication key, and related to the vehicle 10A to be locked or unlocked or to be started with the authentication key, and authorization information including information about an available period and an available number of time of the mobile terminal 20Aa or 20Ab, doors unlockable by the mobile terminal 20Aa or 20Ab, whether or not the mobile terminal 20A or 20Ab can start the vehicle 10A, and the like, which are identified from information included in the key sharing request. Thus, the authentication key issuance unit 323 can identify the regular user ID corresponding to the mobile terminal 20Aa or 20Ab, which is a distribution target of an authentication key, and the vehicle 10A to be locked or unlocked or to be started with an authentication key, and issue an appropriate authentication key.

The key sharing management unit 327 also confirms, for example, attribute information (for example, an age, whether the user has a driver's license, and the like) of the user of the mobile terminal 20Aa or 20Ab, which is a distribution target of an authentication key designated by the key sharing request, the attribute information being stored in the storage unit 320. When the user of the mobile terminal 20Aa or 20Ab (the regular user of the vehicle 10A), which is a distribution target of an authentication key, is a user who is determined not to be able to drive the vehicle 10A, the key sharing management unit 327 issues an authentication key provided with authorization that does not allow the user to start the vehicle 10A, to the mobile terminal 20 of the user. Examples of the user who is not allowed to drive the vehicle 10A include a user who does not yet reach a minimum driving age for a driver's license, and a user who has no driver's license. Specifically, the key sharing management unit 327 sends to the authentication key issuance unit 323 an authentication key arrangement request including authorization information corresponding to the mobile terminal 20Aa or 20Ab that corresponds to the user who is determined not to be allowed to drive the vehicle 10A, the authorization information containing a command to prohibit starting of the vehicle 10A. Thus, since the authentication key issuance unit 323 can distribute an authentication key with authorization that prohibits the vehicle 10A from starting, to the mobile terminal 20Aa or 20Ab of the user who is not allowed to drive the vehicle 10A, it is possible to improve the security of the vehicle 10A in the key sharing service.

For example, based on a temporary key sharing request that is received from the mobile terminal 20Aa of the owner user by the communication processing unit 321, the key sharing management unit 327 distributes the authentication key of the vehicle 10A to another one of the mobile terminals 20 designated by the temporary key sharing request. Specifically, based on an installed user information DB of the key application stored in the storage unit 320, the key sharing management unit 327 identifies an ID of an installed user (hereinafter, referred to as "installed user ID") corresponding to the other one of the mobile terminals 20 that is a distribution target. The key sharing management unit 327 then sends to the authentication key issuance unit 323 an authentication key arrangement request including the identified installed user ID and information (for example, an issued ID of the authentication key included in the temporary key sharing request, or the like) corresponding to the authentication key designated by the temporary key sharing request. Thus, the authentication key issuance unit 323 can identify another one of the mobile terminals 20 that is a distribution target, based on the installed user ID, the issued ID of the authentication key, and the like, and distribute the authentication key to the other one of the mobile terminals 20 via the communication processing unit 321.

The functions of the key sharing management unit 327 may be transferred to a server (key sharing management server) outside the center server 30, which may be included in the service management server 40, as in the case of the other services using the vehicle 10A.

As described above, the mobile terminal 20Ab carried by the child user includes the communication processing unit 231, the communication processing unit 232, the authentication key acquisition unit 233, the authentication request unit 234, the lock/unlock request unit 235, and the storage unit 230.

In the present embodiment, description will be made on the assumption that the function of the authentication key acquisition unit 233 of the mobile terminal 20Ab becomes available to the child user when the key application is activated and user authentication based on bidirectional communication with the center server 30 is successful. Description will also be made on the assumption that the user authentication is performed on the center server 30 based on the child user ID and the password. Description will also be made on the assumption that the functions of the authentication request unit 234, the lock/unlock request unit 235, and the like, of the mobile terminal 20Ab become available to the child user when the key application is activated.

As described above, the authentication key acquisition unit 233 acquires an authentication key that is distributed from the center server 30, in response to a key sharing request that is transmitted from the mobile terminal 20Aa to the center server 30 via the communication processing unit 232. Thus, the mobile terminal 20Ab can lock or unlock the doors of the vehicle 10A and start the vehicle 10A based on the functions of the communication processing unit 231, the authentication request unit 234, and the lock/unlock request unit 235. That is, with the key sharing service, the child user who carries the mobile terminal 20Ab can directly use the vehicle 10A, for example, lock or unlock the vehicle 10A or drive the vehicle 10, with use of the mobile terminal 20Ab without handing over a key to or from the owner user. Similarly, the owner user can lend the vehicle 10A to the child user without handing over a key to or from the child user. For this reason, it is possible to improve the convenience in lending or renting the vehicle 10A between the owner user and the child user of the vehicle 10A with the key sharing service in the authentication key management system 1.

As described above, the authentication key acquisition unit 233 acquires an authentication key that is distributed from the center server 30 in response to a temporary key sharing request that is transmitted from the mobile terminal 20Aa to the center server 30 via the communication processing unit 232. This also applies to the case where an authentication key is distributed to one of the mobile terminals 20 other than the mobile terminal 20Ab of the child user, in response to a temporary key sharing request. Thus, other mobile terminals 20 including the mobile terminal 20Ab can lock or unlock the doors of the vehicle 10A and start the vehicle 10A based on the functions of the communication processing unit 231, the authentication request unit 234, and the lock/unlock request unit 235. That is, even when the child user who carries the mobile terminal 20Ab does not acquire an authentication key in advance, for example, in the situation where two or more persons, including the child user and another regular user get on the vehicle 10A and go out, or the like, the child user can directly use the vehicle 10A, so as to lock or unlock the vehicle 10A or drive the vehicle 10A, with use of the mobile terminal 20Ab without the necessity of borrowing the mobile terminal 20Aa or 20Ab to which an authentication key is already distributed. Similarly, even when the owner user does not make the mobile terminal 20Ab of the child user acquire an authentication key in advance, the owner user does not need to lend the own mobile terminal 20Aa to the child user. Accordingly, it is possible to improve the convenience of users in the case where two or more persons including a regular user of the vehicle 10A get on the vehicle 10A and use the vehicle 10A with temporary key sharing in the authentication key management system 1.

Details of Components Related to Trunk Delivery Service

Next, components related to the trunk delivery service in the authentication key management system 1 will be described with reference to FIG. 4.

Figure 4:
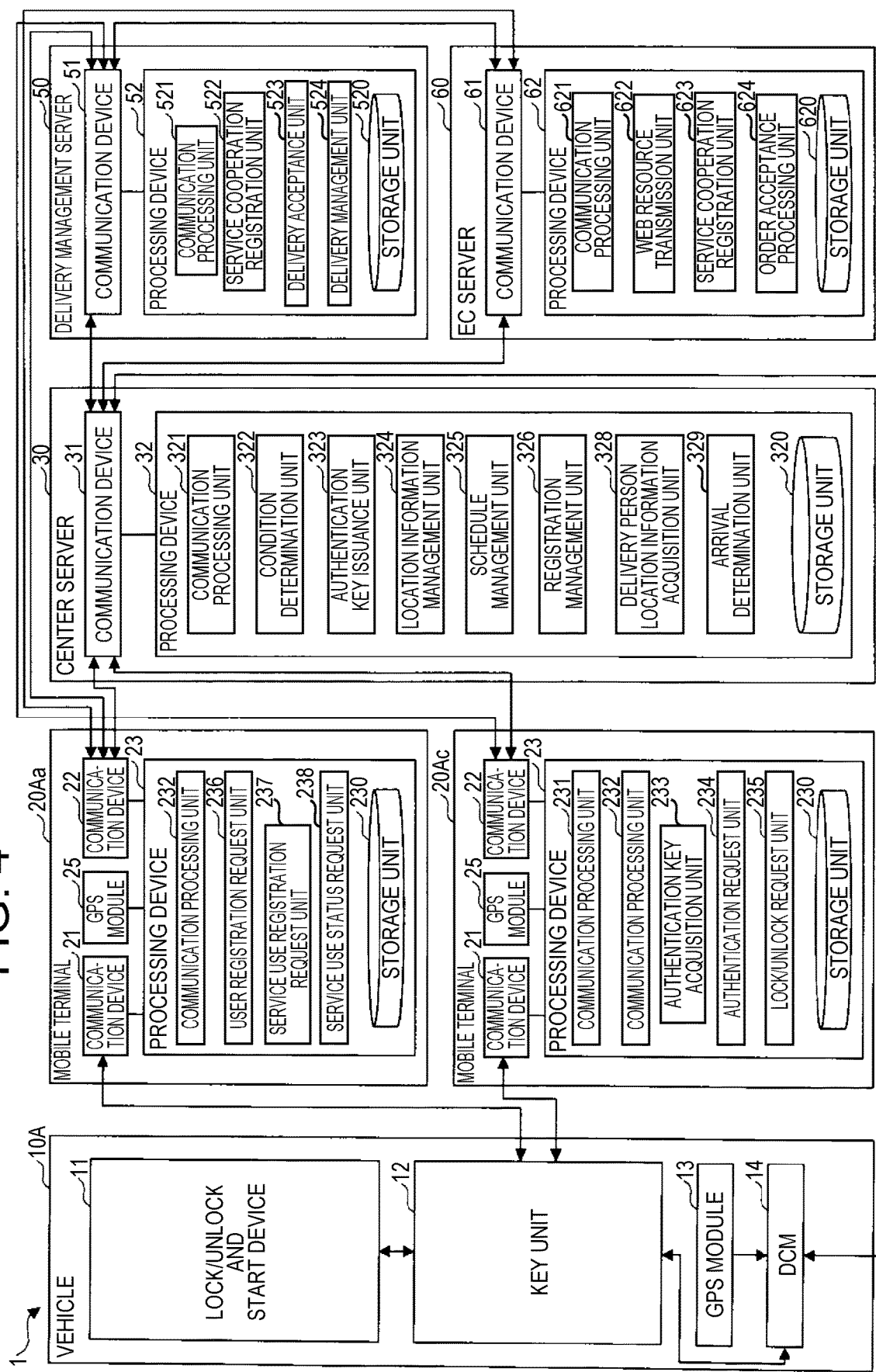
FIG. 4 mainly shows one example of the components related to a trunk delivery service in the authentication key management system.

FIG. 4 mainly shows one example of components related to the trunk delivery service in the authentication key management system 1. Hereinafter, for FIG. 4, components related to the trunk delivery service in the authentication key management system 1 will be mainly described, and the overlapped description of components that overlap with the components related to the above-described key sharing service is omitted as much as possible.

As described above, the processing device 23 of the mobile terminal 20Aa carried by the owner user of the vehicle 10A includes the communication processing unit 232, the user registration request unit 236, the service use registration request unit 237, and the service use status request unit 238.

As described above, in response to a specified operation of the owner user, the user registration request unit 236 requests registration of a regular user (child user) of the vehicle 10A, who uses various services including the trunk delivery service, to the center server 30.

As described above, in response to a specified operation of the owner user, the service use registration request unit 237 requests use registration of various services including the trunk delivery service for each registered regular user (the owner user or the child user) to the center server 30.

For example, the service use registration request unit 237 transmits to the center server 30 a service use registration request for using the trunk delivery service, the service use registration request including a service login ID of a website (hereinafter, referred to as "delivery site") for users who use the service of the delivery management server 50, and a service login ID of an EC site as service link information corresponding to the regular user of the vehicle 10A, who is to be registered.

As described above, in response to a specified operation of the owner user, the service use status request unit 238 requests to the center server 30 information (service use status information) related to the use statuses of various services, including the trunk delivery service, used by the regular users of the vehicle 10A who have been registered in association with the owner user ID.

The delivery management server 50 that operates the trunk delivery service (vehicle cabin delivery service) includes a communication device 51 and the processing device 52.

The communication device 51 is any device that bidirectionally performs communication with each of the mobile terminals 20, the center server 30, and the EC server 60 through a specified communication network.

The processing device 52 includes, for example, a communication processing unit 521, a service cooperation registration unit 522, a delivery acceptance unit 523, and a delivery management unit 524 as functional units that are implemented by executing one or more programs stored in the ROM or the auxiliary storage device on the CPU. The processing device 52 also includes the storage unit 520 that is implemented as a storage area, such as the auxiliary storage device of the server computer.

The communication processing unit 521 controls the communication device 51, and exchanges various signals, such as control signals and information signals, with each of the mobile terminals 20, the center server 30, and the EC server 60.

The service cooperation registration unit 522 registers information for cooperation between the center server 30 and the delivery management server 50, related to usage of the trunk delivery service by the regular users of the vehicle 10A, in response to a service use registration completion notification that is received from the center server 30 by the communication processing unit 521.

For example, the service cooperation registration unit 522 adds a flag indicative of a trunk delivery service user to the service login ID (constituting the service link information) included in a service use registration completion notification in a user management DB that manages users of the delivery site constructed in the storage unit 520. At the same time, the service cooperation registration unit 522 registers the service login ID included in the service use registration completion notification in the user management DB of the storage unit 520 in association with information that identifies the vehicle 10A, which is included in the service link information and a service login ID of the website (that is, EC site) corresponding to the EC server 60, which is included in the service use registration completion notification. Thus, when the user corresponding to a service login ID regularly uses the plurality of vehicles 10A, the delivery management server 50 can transmit to the center server 30 an authentication key arrangement request for the vehicle 10A designated by the user. When acceptance of an order including a service login ID is received from the EC server 60 by the communication processing unit 521, the delivery management server 50 can identify the corresponding service login ID of the delivery site. Consequently, the delivery management server 50 can cause the center server 30 to distribute an authentication key to the mobile terminal 20Ac of a delivery person, as described later, by transmitting to the center server 30 an authentication key arrangement request including the service link information such as the identified service login ID and the information that identifies the vehicle 10A corresponding to the vehicle 10A designated by the user.

The delivery acceptance unit 523 accepts, from the EC server 60, information (delivery request information) related to a request to deliver a package, including the service login ID of the EC site corresponding to an orderer of an article on the EC site, via the communication processing unit 521. The delivery request information that is accepted from the EC server 60 includes not only basic information, such as a name, an address, and a telephone number of an orderer as a delivery destination, but also information (delivery destination information) related to a designated delivery destination, and information (delivery date and time information) related to designated delivery date and time.

The delivery management unit 524 manages operations of all the processes from request to delivery that are related to a delivery request accepted in the delivery acceptance unit 523.

For example, when the delivery management unit 524 accepts, through the communication processing unit 521, a notification notifying arrival of a package at a sales office that is in charge of a parking location of the vehicle 10A designated by the delivery destination information of a delivery request, the delivery management unit 524 determines date and time of departure for delivery of the package, a delivery person in charge, and the like, in accordance with the designated delivery date and time (delivery date and time period).

Subsequently, the delivery management unit 524 makes an inquiry about the location information on the vehicle 10A to the center server 30 via the communication processing unit 521 before departure for delivery of the intended package (for example, 10 minutes before scheduled departure time). Then, the delivery management unit 524 acquires current location information on the vehicle 10A from the center server 30 via the communication processing unit 521, and determines whether or not delivery is possible based on matching with the designated parking location of the vehicle 10A, a relationship with an area in charge, and the like.

Whether or not delivery is possible may be determined in the center server 30.

The delivery management unit 524 also transmits a delivery destination list of a plurality of packages, including the intended package, that a delivery person in charge takes out from a sales office for one delivery session, to the center server 30 through the communication processing unit 521, before departure for delivery of the intended package (for example, 10 minutes before scheduled departure time).

Subsequently, when determining that the intended package is deliverable, the delivery management unit 524 transmits a notification (deliverable notification) that the package is deliverable to the trunk of the vehicle 10A, to the mobile terminal 20Ac of the delivery person via the communication processing unit 521.

Subsequently, when the communication processing unit 521 receives an authentication key acquisition request from the mobile terminal 20Ac that has received the deliverable notification, the delivery management unit 524 determines whether or not the authentication key acquisition request is a legal authentication key acquisition request. Specifically, the delivery management unit 524 may perform the determination by comparing information (hereinafter, referred to as "delivery package information" for the sake of convenience) related to a package to be delivered, including a delivery person, a delivery destination (for example, a name or a corporate name of a recipient, or the like), the type of the package, a delivery time period, and a delivery place, which may be included in the authentication key acquisition request, with various pieces of information related to the package, registered in the storage unit 520. When the delivery management unit 524 determines that the authentication key acquisition request is a legal authentication key acquisition request, the delivery management unit 524 transmits an authentication key arrangement request to the center server 30 via the communication processing unit 521. At this time, the authentication key arrangement request includes information for identifying the mobile terminal 20Ac of the delivery person. The information for identifying the delivery person may be, for example, an authentication ID (hereinafter, referred to as "delivery person ID" for the sake of convenience) for a delivery person to get user authentication in the center server 30 in order to use the functions of the key application, corresponding to the authentication key acquisition unit 233, and the like, of the mobile terminal 20Ac. Thus, the mobile terminal 20Ac of the delivery person can acquire an authentication key from the center server 30. The authentication key arrangement request also includes information that identifies the intended package. Thus, the center server 30 can identify the package scheduled to be delivered based on an authentication key distributed in response to an authentication key arrangement request, and can compare the package with a delivery destination list.

Subsequently, when accepting, via the communication processing unit 521, an inquiry about the current location of the vehicle 10A from the mobile terminal 20Ac of the delivery person who has left for delivery from a sales office, the delivery management unit 524 makes an inquiry about the current location information on the vehicle 10A to the center server 30. The delivery management unit 524 acquires the current location information on the vehicle 10A from the center server 30 via the communication processing unit 521, and transmits (transfers) the current location information on the vehicle 10A to the mobile terminal 20Ac of the delivery person. Thus, the delivery person on the road can compare the current location information on the vehicle 10A with the information related to the parking location of the vehicle 10A designated by the delivery destination information, and determine, for example, whether to deliver or bring back the package.

Lastly, when receiving, via the communication processing unit 521, a delivery completion notification that is received from the mobile terminal 20Ac of the delivery person who has completed delivery of the package, the delivery management unit 524 transmits the delivery completion notification to the center server 30 through the communication processing unit 521. As a result, management of operations about the trunk delivery service related to the package is basically ended. At this time, the delivery management unit 524 may provide a notification notifying completion of delivery to the regular user of the vehicle 10A, who is a client (a purchaser of an article on the EC site), through an electric mail or a specified application installed onto the mobile terminals 20Aa, 20Ab, the application being operated in cooperation with the delivery site.

As described above, when a door (trunk lid, or the like) for accessing the trunk of the vehicle 10A is unlocked and then locked, the DCM 14 of the vehicle 10A may determine that delivery by the delivery person is completed, and may notify the center server 30 of the completion of delivery. Thus, when receiving the notification, the center server 30 can transmit a delivery completion notification to the delivery management server 50. That is, the delivery completion notification may be transmitted from the center server 30 to the delivery management server 50.

The EC server 60 includes a communication device 61 and the processing device 62.

The communication device 61 is any device that bidirectionally performs communication with each of the mobile terminals 20, the center server 30, and the delivery management server 50 through a specified communication network.

The processing device 62 includes, for example, a communication processing unit 621, a web resource transmission unit 622, a service cooperation registration unit 623, and an order acceptance processing unit 624 as functional units that are implemented by executing one or more programs stored in the ROM or the auxiliary storage device on the CPU. The processing device 62 also includes the storage unit 620 that is implemented as a storage area, such as the auxiliary storage device of the server computer.

The communication processing unit 621 controls the communication device 61, and exchanges various signals, such as control signals and information signals, with each of the mobile terminals 20, the center server 30, and the delivery management server 50.

Based on various pieces of information saved in the storage unit 620 as resources of the EC site, the web resource transmission unit 622 transmits resources, corresponding to webpages to be displayed on browsers on any terminals of users, who browse the EC site, including the mobile terminals 20Aa, 20Ab, to the browsers of the terminals in a specified manner. The webpages that may be displayed on the EC site include a top page of the EC site, webpages corresponding to individual articles that are dealt with on the EC site, and an order input page that receives various pieces of information input by users at the time of ordering individual articles. For example, the web resource transmission unit 622 transmits hypertext markup language (HTML) documents corresponding to the webpages, and information under the HTML documents, such as images and moving images, to be displayed on the webpages, in parallel with each other.

The service cooperation registration unit 623 registers information for cooperation between the center server 30 and the EC server 60, related to usage of the trunk delivery service by the regular users of the vehicle 10A, in response to a service use registration completion notification that is received from the center server 30 by the communication processing unit 621. For example, the service cooperation registration unit 623 adds a flag indicative of a trunk delivery service user to the service login ID included in the service use registration completion notification in a user management DB for managing users of the EC site constructed in the storage unit 620. At the same time, the service cooperation registration unit 623 registers the service login ID included in the service use registration completion notification in the user management DB in association with a service login ID of the website (that is, the delivery site) corresponding to the delivery management server 50, which is included in the service use registration completion notification. Thus, for example, when the communication processing unit 621 receives an inquiry, or the like, about an ordered article, including the service login ID of the delivery site, from the delivery management server 50, the EC server 60 can identify the corresponding service login ID of the EC site.

Based on various input operations corresponding to an order of an article from a user on the EC site, the order acceptance processing unit 624 accepts the order of the article from the user. At this time, when the trunk of the vehicle 10A is selected as a delivery destination on the order input page on the EC site, the order acceptance processing unit 624 makes an inquiry about vehicle use schedule information to the center server 30 via the communication processing unit 621. Thus, the order acceptance processing unit 624 can acquire the latest vehicle use schedule information via the communication processing unit 621. Accordingly, for example, when designated delivery date and time already overlaps with another schedule, the order acceptance processing unit 624 can take action, such as requesting a change of the delivery date and time.

As described above, a trunk delivery service intended for a package other than the article ordered on the EC site is also conceivable. In this case, the delivery management server 50 may similarly acquire the latest vehicle use schedule information from the center server 30. Thus, when delivery date and time of a package to the trunk of the vehicle 10A designated by a regular user of the vehicle 10A already overlaps with another schedule, the delivery management server 50 can take action, such as requesting a change of the delivery date and time.

As described above, the processing device 32 of the center server 30 that assists in operations of the trunk delivery service (vehicle cabin delivery service) includes the communication processing unit 321, the condition determination unit 322, the authentication key issuance unit 323, the location information management unit 324, the schedule management unit 325, the registration management unit 326, and the storage unit 320. The processing device 32 of the center server 30 (one example of the key information management device) also includes a delivery person location information acquisition unit 328 and an arrival determination unit 329 as functional units implemented by, for example, executing one or more programs stored in the auxiliary storage device, or the like, of the server computer on the CPU.

When receiving an authentication key arrangement request from the delivery management server 50 via the communication processing unit 321, the condition determination unit 322 determines whether or not the authentication key arrangement request is a legal authentication key arrangement request. For example, the condition determination unit 322 determines whether or not the authentication key arrangement request is a legal authentication key arrangement request based on service login information (a service login ID of the delivery site, or the like) included in the authentication key arrangement request, and specified authentication information (for example, an ID and a password, or the like) corresponding to the delivery management server 50.

When the condition determination unit 322 determines that the authentication key arrangement request is a legal authentication key arrangement request, that is, when a legal authentication key arrangement request is received, the authentication key issuance unit 323 (one example of the key information distribution unit) further determines whether or not a predetermined condition for suppressing an inadequate use of the authentication key by a delivery company is satisfied. When the predetermined condition is satisfied, the authentication key issuance unit 323 issues an authentication key corresponding to the authentication key arrangement request, and distributes the authentication key to the mobile terminal 20Ac of the delivery person.

Specifically, the authentication key issuance unit 323 identifies the vehicle 10A corresponding to the authentication key arrangement request based on the user and service registration information DB of the storage unit 320. The authentication key issuance unit 323 issues an authentication key with limited authorization that is for a limited time (for example, usable within only a time unit of several minutes to several tens of minutes from distribution), that limits the number of times the authentication key is available (for example, usable only once), and that only allows the trunk lid to be locked or unlocked. Thus, it is possible to prevent a delivery person from using the vehicle 10A without authorization and to thereby improve the security. The authentication key issuance unit 323 distributes, via the communication processing unit 321, an authentication key to the mobile terminal 20Ac of the delivery person identified by the authentication key arrangement request.

As a method of limiting the available period of an authentication key, the number of times an authentication key can be used, and the like, any method, such as a known mathematical method and a method using bidirectional communication between the center server 30 and the vehicle 10, may be employed.

The details of the operations by the authentication key issuance unit 323, including the details of the predetermined condition for suppressing an inadequate use of the authentication key by a delivery company described above will be described later (see FIGS. 7 to 9).

For example, in response to an inquiry about the current location of the vehicle 10A from the delivery management server 50 received by the communication processing unit 321, the location information management unit 324 acquires, as described above, the location information from the vehicle 10A through the communication processing unit 321, and provides (transmits) the acquired location information to the delivery management server 50 via the communication processing unit 321.

In response to, for example, a request from the authentication key issuance unit 323, the location information management unit 324 (one example of the vehicle location information acquisition unit) acquires the location information from the vehicle 10A via the communication processing unit 321.

In response to an inquiry from the EC server 60 received by the communication processing unit 321, the schedule management unit 325 returns the latest vehicle use schedule information saved in the storage unit 320 to the EC server 60 via the communication processing unit 321.

As described above, the registration management unit 326 registers a regular user (child user) who uses various services including the trunk delivery service in response to a user registration request that is received from the mobile terminal 20Aa of the owner user by the communication processing unit 321. As described above, the registration management unit 326 also performs use registration of the trunk delivery service by the regular user of the vehicle 10A in response to a service use registration request that is received from the mobile terminal 20Aa of the owner user by the communication processing unit 321. When use registration of various services, including the trunk delivery service, is completed as described above, the registration management unit 326 provides the notification of completion to the mobile terminal 20Aa or 20Ab corresponding to a regular user to be registered, via the communication processing unit 321. When completing the use registration of the trunk delivery service, the registration management unit 326 also transmits a service use registration completion notification including service link information to the delivery management server 50 and the EC server 60, which manage operations of the registered service, via the communication processing unit 321.

The delivery person location information acquisition unit 328 acquires the location information on the mobile terminal 20Ac carried by a delivery person. For example, the delivery person location information acquisition unit 328 makes an inquiry through the communication processing unit 321 by a known method using a key application that is installed on the mobile terminal 20Ac carried by the delivery person. Thus, the delivery person location information acquisition unit 328 can acquire, through the communication processing unit 321, positioning information (location information) on the mobile terminal 20Ac based on the GPS module 25 (GPS function) and a base station positioning function of the mobile terminal 20Ac. For example, the delivery person location information acquisition unit 328 also makes an inquiry to the delivery management server 50 through the communication processing unit 321. Thus, the delivery person location information acquisition unit 328 can acquire the location information on the mobile terminal 20Ac carried by the delivery person through the delivery management server 50.

The arrival determination unit 329 (one example of the determination unit) determines whether or not a delivery person has reached the vehicle 10A corresponding to the delivery destination of an intended package. Specifically, the arrival determination unit 329 determines whether or not the delivery person has reached within a specified range in the vicinity of the vehicle 10A (for example, tens of meters to hundreds of meters). The details of the determination technique by the arrival determination unit 329 will be described later (see FIGS. 7 and 8).

As described above, the processing device 23 of the mobile terminal 20Ac of a delivery person includes the communication processing unit 231, the communication processing unit 232, the authentication key acquisition unit 233, the authentication request unit 234, and the lock/unlock request unit 235.

In the present embodiment, description will be made on the assumption that the functions of the authentication key acquisition unit 233, the authentication request unit 234, and the lock/unlock request unit 235 of the mobile terminal 20Ac become available to the delivery person when the key application is activated.

The authentication key acquisition unit 233 transmits an authentication key acquisition request to the delivery management server 50 via the communication processing unit 232 in response to a specified operation of the delivery person. At this time, the authentication key acquisition request includes the above-described delivery package information saved in the storage unit 230 in advance. Thus, the delivery management server 50 transmits an authentication key arrangement request to the center server 30 in response to the authentication key acquisition request, and the center server 30 distributes an authentication key to the mobile terminal 20Ac in response to the authentication key arrangement request. As a result, the mobile terminal 20Ac can acquire the authentication key. Thus, since the mobile terminal 20Ac can lock or unlock the trunk lids of the vehicle 10A based on the functions of the communication processing unit 231, the authentication request unit 234, and the lock/unlock request unit 235, the delivery person can deliver a requested package to the trunk of the vehicle 10A, lock the trunk of the vehicle 10A as it was before, and leave.

Details of Components Related to C2C Car Sharing Service

Next, components related to the C2C car sharing service in the authentication key management system 1 will be described with reference to FIG. 5.

Figure 5:
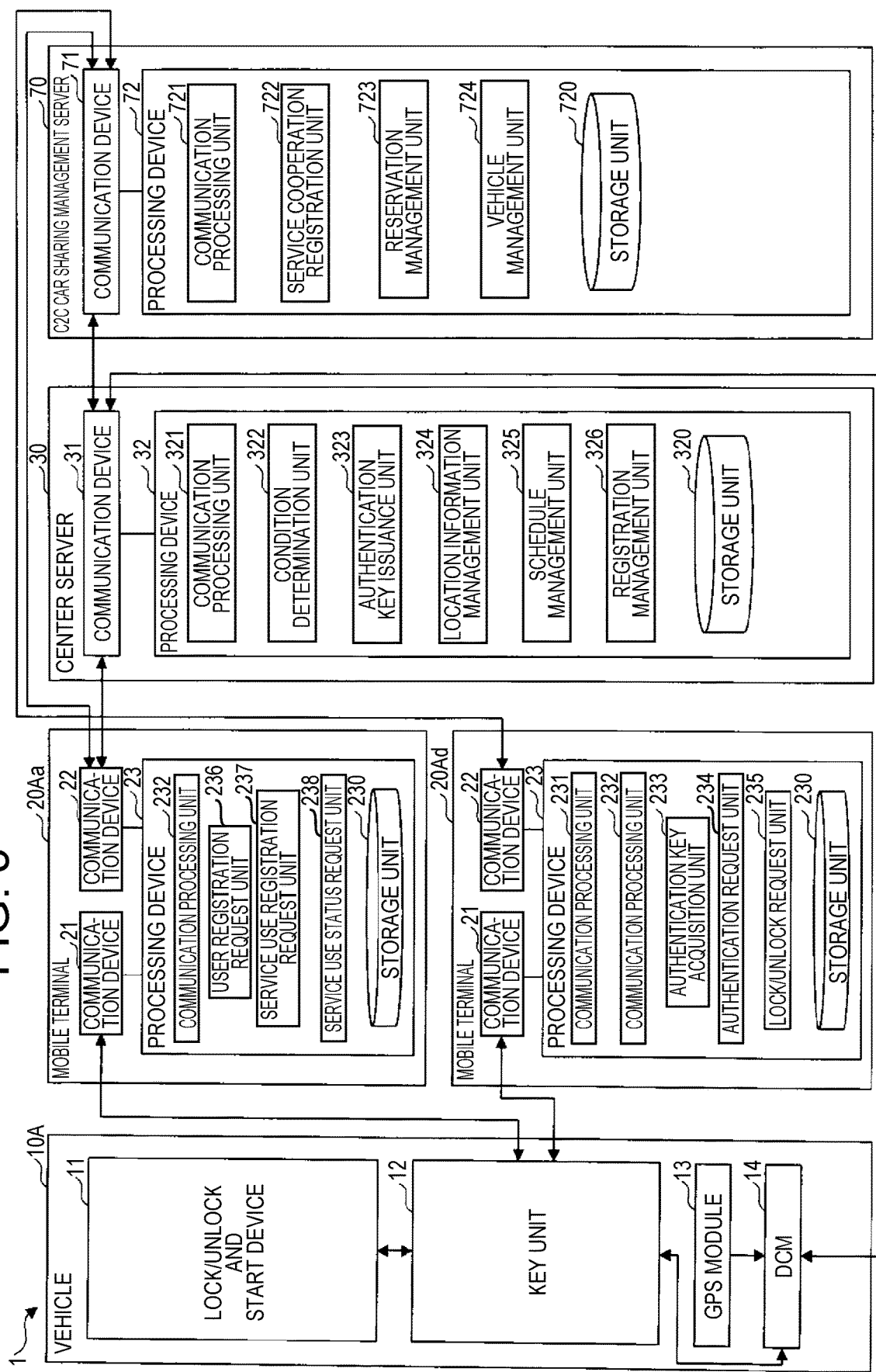
FIG. 5 mainly shows one example of the components related to a C2C car sharing service in the authentication key management system.

FIG. 5 mainly shows one example of components related to the C2C car sharing service in the authentication key management system 1. Hereinafter, for FIG. 5, the components related to the C2C car sharing service in the authentication key management system 1 will be mainly described, and the overlapped description of components that overlap with the components related to the above-described key sharing service, and the like, is omitted as much as possible.

As described above, the processing device 23 of the mobile terminal 20Aa carried by the owner user of the vehicle 10A includes the communication processing unit 232, the user registration request unit 236, the service use registration request unit 237, and the service use status request unit 238.

As described above, the user registration request unit 236 requests registration of a regular user (child user) of the vehicle 10A, who uses various services including the C2C car sharing service, to the center server 30 in response to a specified operation of the owner user.

As described above, the service use registration request unit 237 requests use registration of various services, including the C2C car sharing service, for each registered regular user (the owner user or the child user) to the center server 30 in response to a specified operation of the owner user.

For example, the service use registration request unit 237 transmits to the center server 30 a service use registration request for using the C2C car sharing service, the service use registration request including a service login ID of a website (hereinafter, referred to as "C2C car sharing site") for users who use the C2C car sharing service corresponding to the C2C car sharing management server 70, as service link information corresponding to the regular user of the vehicle 10A, who is to be registered.

As described above, the service use status request unit 238 requests information (service use status information) related to the use statuses of various services, including the C2C car sharing service, used by the regular user of the vehicle 10A, who has been registered for use in association with the owner user ID, to the center server 30 in response to a specified operation of the owner user.

The C2C car sharing management server 70 includes a communication device 71 and the processing device 72.

The communication device 71 is any device that bidirectionally performs communication with each of the mobile terminals 20 and the center server 30 through a specified communication network.

The processing device 72 includes, for example, a communication processing unit 721, a service cooperation registration unit 722, a reservation management unit 723, and a vehicle management unit 724 as functional units that are implemented by executing one or more programs stored in the ROM or the auxiliary storage device on the CPU. The processing device 72 also includes a storage unit 720 that is implemented as a storage area, such as the auxiliary storage device of the server computer.

Description will be made on the assumption that information that identifies the vehicle 10A for rent is already registered (saved) in the storage unit 720 through the C2C car sharing site by the regular user (owner user) of the vehicle 10A in association with a service login ID.

The communication processing unit 721 controls the communication device 71, and exchanges various signals, such as control signals and information signals, with each of the mobile terminals 20 and the center server 30.

The service cooperation registration unit 722 registers information for cooperation between the center server 30 and the C2C car sharing management server 70, related to usage of the C2C car sharing service by the regular user of the vehicle 10A, in response to a service use registration completion notification that is received from the center server 30 by the communication processing unit 721.

For example, the service cooperation registration unit 722 adds a flag indicative of a lender of the vehicle 10A in the C2C car sharing service to the service login ID included in the service use registration completion notification in a user management DB for managing users on the C2C car sharing site constructed in the storage unit 720. Thus, the C2C car sharing management server 70 can cause the center server 30 to distribute an authentication key to the mobile terminal 20Ad of a renter as described later, by transmitting an authentication key arrangement request including a service login ID corresponding to the regular user of the vehicle 10A, who is a lender, to the center server 30.

The reservation management unit 723 manages reservations for the use of the vehicle 10A through the C2C car sharing site, or the like.

For example, the reservation management unit 723 accepts registration of rentable date and time of the vehicle 10A from the regular user of the vehicle 10A through the C2C car sharing site, or the like, and registers (saves) the received lendable date and time in the storage unit 720. At this time, the reservation management unit 723 makes an inquiry about vehicle use schedule information to the center server 30 via the communication processing unit 721. Thus, the reservation management unit 723 can acquire the latest vehicle use schedule information via the communication processing unit 721. Accordingly, for example, when the rentable date and time accepted from the regular user of the vehicle 10A already overlaps with another schedule, the C2C car sharing management server 70 can take action, such as requesting a change of the rentable date and time, and registering rentable date and time with the overlapped time excluded from the accepted rentable date and time.

For example, the reservation management unit 723 also accepts a reservation for the use of the vehicle 10A within the rentable date and time of the vehicle 10A saved in the storage unit 720. When the reservation management unit 723 accepts a reservation for the use of the vehicle 10A from a user who is a renter through the C2C car sharing site, the reservation management unit 723 updates information (rental schedule information) about a rental schedule of the vehicle 10A saved in the storage unit 720.

For example, when the communication processing unit 721 receives an authentication key acquisition request from the mobile terminal 20Ad of the renter of the vehicle 10A, the reservation management unit 723 determines whether or not the authentication key acquisition request is a legal authentication key acquisition request. Specifically, the reservation management unit 723 may carry out the determination based on the service login ID and the password of the C2C car sharing site, included in the authentication key acquisition request, and on a relation with reservation date and time (for example, whether the date and time of receiving the request is within the reservation date and time, whether a period of time from the date and time of receiving the request to use start date and time is shorter than a specified time, or the like). When the authentication key acquisition request is a legal authentication key acquisition request, the reservation management unit 723 transmits an authentication key arrangement request to the center server 30 via the communication processing unit 721. At this time, the authentication key arrangement request includes information for identifying the mobile terminal 20Ad of the renter of the vehicle 10A. The information for identifying the renter of the vehicle 10A may be, for example, an authentication ID (hereinafter, referred to as "renter ID" for the sake of convenience) to get user authentication in the center server 30 in order for the renter of the vehicle 10A to use the function of the authentication key acquisition unit 233 of the mobile terminal 20Ad. Thus, the mobile terminal 20Ad of the renter of the vehicle 10A can acquire an authentication key from the center server 30.

The vehicle management unit 724 manages the vehicle 10A for rent.

For example, the vehicle management unit 724 makes an inquiry about the current location information on the vehicle 10A to the center server 30 via the communication processing unit 721 before use reservation date and time of the vehicle 10A (for example, in a period from several tens of minutes before the use reservation date and time to immediately before the use reservation date and time). The vehicle management unit 724 acquires, via the communication processing unit 721, the current location information on the vehicle 10A that is returned from the center server 30 in response to the inquiry. Thus, it is possible to determine, for example, whether the vehicle 10A is returned to a designated place before the scheduled rental date and time (use reservation date and time) of the vehicle 10A. Accordingly, when the vehicle 10A is not yet returned to the designated place, the C2C car sharing management server 70 can take action, such as warning the regular user who is the lender of the vehicle 10A to return to the designated place through an electric mail or a specified application that cooperates with the C2C car sharing site, installed onto the mobile terminal 20Aa or 20Ab.

As described above, the processing device 32 of the center server 30 includes the communication processing unit 321, the condition determination unit 322, the authentication key issuance unit 323, the location information management unit 324, the schedule management unit 325, the registration management unit 326, and the storage unit 320.

When the communication processing unit 321 receives an authentication key arrangement request from the C2C car sharing management server 70, the condition determination unit 322 determines whether or not the authentication key arrangement request is a legal authentication key arrangement request. For example, the condition determination unit 322 determines whether or not the authentication key arrangement request is a legal authentication key arrangement request based on service link information (a service login ID of the C2C car sharing site, or the like) included in the authentication key arrangement request or specified authentication information (for example, an ID and a password, or the like) corresponding to the C2C car sharing management server 70.

When the condition determination unit 322 determines that the authentication key arrangement request is a legal authentication key arrangement request, the authentication key issuance unit 323 identifies the vehicle 10A corresponding to the authentication key arrangement request based on the user and service registration information DB of the storage unit 320. The authentication key issuance unit 323 issues an authentication key for a limited time (for example, an authentication key available only within use reservation date and time of the vehicle 10A, included in the authentication key arrangement request, and buffer periods before and after the use reservation date and time). The authentication key issuance unit 323 then distributes the authentication key to the mobile terminal 20Ad of the renter of the vehicle 10A identified by the authentication key arrangement request.

The C2C car sharing service may include, for example, a service for lending only the trunk of the vehicle 10A (hereinafter referred to as "vehicle trunk rental service" for the sake of convenience). In the case of a vehicle trunk rental service, the authentication key issuance unit 323 may issue an authentication key with limited authorization that only allows the trunk lid to be locked or unlocked. Thus, it is possible to limit a rental target of the C2C car sharing to the trunk only. This makes it possible to implement a trunk delivery service that allows, for example, a person on a trip to rent the trunk of the vehicle 10A that is for rent at a trip destination, and get delivery of purchased articles for use during the trip to the rented trunk.

The location information management unit 324 transmits a location information request to the vehicle 10A via the communication processing unit 321 in response to an inquiry about the current location on the vehicle 10A received from the C2C car sharing management server 70 by the communication processing unit 321. Thus, the location information management unit 324 can acquire the current location information from the vehicle 10A via the communication processing unit 321. The location information management unit 324 returns the current location information acquired from the vehicle 10A to the C2C car sharing management server 70 via the communication processing unit 321.

The schedule management unit 325 transmits the latest vehicle use schedule information to the vehicle 10A via the communication processing unit 321 in response to the inquiry about the current location on the vehicle 10A received from the C2C car sharing management server 70 by the communication processing unit 321.

As described above, the registration management unit 326 registers a regular user (child user) who uses various services including the C2C car sharing service, in response to a user registration request that is received from the mobile terminal 20Aa of the owner user by the communication processing unit 321. As described above, the registration management unit 326 performs use registration of the C2C car sharing service by the regular user of the vehicle 10A in response to the service use registration request that is received from the mobile terminal 20Aa of the owner user by the communication processing unit 321. When use registration of various services, including the C2C car sharing service, is completed as described above, the registration management unit 326 provides the notification of completion to the mobile terminal 20Aa or 20Ab, corresponding to a regular user to be registered, via the communication processing unit 321. When completing the use registration of the C2C car sharing service, the registration management unit 326 also transmits a service use registration completion notification including service link information to the delivery management server that manages operations of the service intended for registration.

As described above, the processing device 23 of the mobile terminal 20Ad of the renter of the vehicle 10A includes the communication processing unit 231, the communication processing unit 232, the authentication key acquisition unit 233, the authentication request unit 234, the lock/unlock request unit 235, and the storage unit 230.

The authentication key acquisition unit 233 transmits an authentication key acquisition request to the C2C car sharing management server 70 via the communication processing unit 232 in response to a specified operation of the renter of the vehicle 10A. At this time, the authentication key acquisition request includes a service login ID of the C2C car sharing site corresponding to the renter of the vehicle 10A, or the like. Thus, the C2C car sharing management server 70 transmits an authentication key arrangement request to the center server 30 in response to the authentication key acquisition request. The center server 30 distributes an authentication key to the mobile terminal 20Ad in response to the authentication key arrangement request. As a result, the mobile terminal 20Ad can acquire the authentication key. Thus, the mobile terminal 20Ad can lock or unlock the doors of the vehicle 10A based on the functions of the communication processing unit 231, the authentication request unit 234, and the lock/unlock request unit 235. That is, with the C2C car sharing service, the renter of the vehicle 10A, who carries the mobile terminal 20Ad, can directly use the vehicle 10A, for example, lock or unlock the vehicle 10A or drive the vehicle 10A, with use of the mobile terminal 20Ad without handing over a key to or from the regular users of the vehicle 10A. Similarly, the regular user of the vehicle 10A can lend the vehicle 10A to a user other than the regular users without handing over a key. Accordingly, it is possible to improve the convenience in lending or renting the vehicle 10A between the normal users of the vehicle 10A and users other than the normal users, with the C2C car sharing service in the authentication key management system 1.

Details of Components Related to B2C Car Sharing Service

Next, the B2C car sharing in the authentication key management system 1 will be described with reference to FIG. 6.

Figure 6:
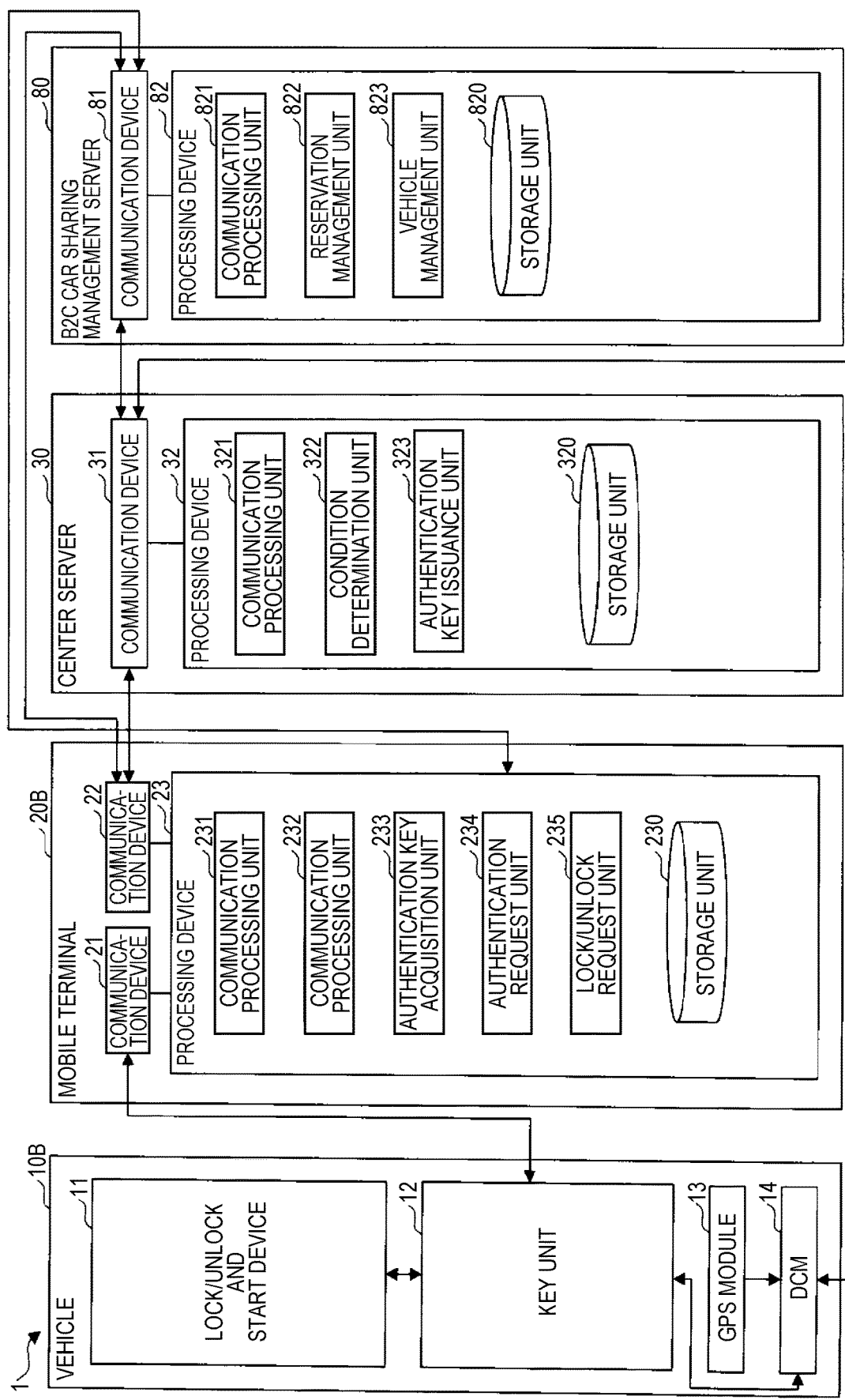
FIG. 6 mainly shows one example of the components related to a B2C car sharing service in the authentication key management system.

FIG. 6 mainly shows one example of components related to the B2C car sharing service in the authentication key management system 1. Hereinafter, for FIG. 6, the components related to the B2C car sharing service in the authentication key management system 1 will mainly be described, and the overlapped description of components that overlap with the components related to the above-described key sharing service, and the like, is omitted as much as possible.

The B2C car sharing management server 80 includes a communication device 81 and the processing device 82.

The communication device 81 is any device that bidirectionally performs communication with each of the mobile terminal 20B and the center server 30 through a specified communication network.

The processing device 82 includes, for example, a communication processing unit 821, a reservation management unit 822, and a vehicle management unit 823 as functional units that are implemented by executing one or more programs stored in the ROM or the auxiliary storage device on the CPU. The processing device 82 also includes the storage unit 820 that is implemented as a storage area, such as the auxiliary storage device of the server computer.

The communication processing unit 821 controls the communication device 81, and exchanges various signals, such as control signals and information signals, with each of the mobile terminal 20B and the center server 30.

The reservation management unit 822 manages reservations for the use of the vehicle 10B through the B2C car sharing site, or the like.

For example, the reservation management unit 822 accepts a reservation for the use of the vehicle 10B from a user (hereinafter, referred to as "rent user") who wants to rent the vehicle 10B through a website (hereinafter, referred to as "B2C car sharing site" for the sake of convenience) that is operated by a company of the B2C car sharing management server 80, or the like. Then, the reservation management unit 822 saves information (use reservation information) about the accepted reservation for the use of the vehicle 10A in the storage unit 820. At this time, the use reservation information includes, for example, information that identifies the intended vehicle 10A, information related to use reservation date and time (start date and time and end date and time), a service login ID of the rent user on the B2C car sharing site, and the like.

For example, every time the reservation management unit 822 accepts a reservation for the use of the vehicle 10B, the reservation management unit 822 updates information (vehicle use schedule information) related to the use schedule of the vehicle 10B, saved in the storage unit 820. Thus, the B2C car sharing management server 80 can show available dates and times for reservation to the rent user by causing the B2C car sharing site to display the use schedule of the vehicle 10B.

For example, when the communication processing unit 821 receives an authentication key request from the mobile terminal 20B, the reservation management unit 822 determines whether or not the authentication key acquisition request is a legal authentication key acquisition request. Specifically, the reservation management unit 822 may carry out the determination based on the service login ID and the password of the B2C car sharing site, corresponding to the rent user included in the authentication key request, and on a relation with use reservation date and time (for example, whether the date and time of receiving the request is within the use reservation date and time, whether a period of time from the date and time of receiving the request to start date and time is shorter than a specified time, or the like). When the authentication key acquisition request is a legal authentication key acquisition request, the reservation management unit 822 transmits an authentication key arrangement request to the center server 30 via the communication processing unit 821. At this time, the authentication key arrangement request includes information for identifying the mobile terminal 20B of the rent user who rents the vehicle 10B. The information for identifying the rent user who rents the vehicle 10B may be, for example, an authentication ID (hereinafter, referred to as "rent user ID" for the sake of convenience) to get user authentication in the center server 30 in order for the rent user who rents the vehicle 10B to use the functions of the key application, corresponding to the authentication key acquisition unit 233, and the like, of the mobile terminal 20B. Thus, the mobile terminal 20B of the rent user who rents the vehicle 10B can acquire an authentication key from the center server 30.

The vehicle management unit 823 manages the vehicle 10B for rent.

For example, before (for example, several tens of minutes before) use reservation date and time of the vehicle 10B by a rent user, the vehicle management unit 823 makes an inquiry about the vehicle 10B parked around (for example, within several hundreds of meters, or the like, from) a place designated in the reservation for use, to the center server 30 via the communication processing unit 821. The vehicle management unit 823 then acquires, via the communication processing unit 821, the location information on the vehicle 10B parked around the designated place, returned from the center server 30 in response to the inquiry. Thus, before the date and time of start using the vehicle 10B of the renter, the vehicle management unit 823 can identify one or a plurality of vehicles 10B parked around the designated place, and determine, for example, which vehicle 10B to lend.

For example, the vehicle management unit 823 makes an inquiry about the location information on the vehicle 10B in a designated area to the center server 30 via the communication processing unit 821, in response to a search request for the vehicle 10B within the designated area from the rent user on the B2C car sharing site. The vehicle management unit 823 acquires, via the communication processing unit 821, the location information on the vehicle 10B within the designated area, returned from the center server 30 in response to the inquiry. Thus, the vehicle management unit 823 can show, for example, the location information on the intended vehicle 10B to the rent user who wants to immediately rent the vehicle 10B within the designated area on the B2C car sharing site.

As described above, the processing device 32 of the center server 30 includes the communication processing unit 321, the condition determination unit 322, the authentication key issuance unit 323, and the storage unit 320.

When the communication processing unit 321 receives an authentication key arrangement request from the B2C car sharing management server 80, the condition determination unit 322 determines whether or not the authentication key arrangement request is a legal authentication key arrangement request. For example, the condition determination unit 322 determines whether or not the authentication key arrangement request is a legal authentication key arrangement request based on whether the rent user ID included in the authentication key arrangement request is the authentication ID registered in the storage unit 320 or based on specified authentication information (for example, an ID and a password, or the like) corresponding to the B2C car sharing management server 80.

When the condition determination unit 322 determines that the authentication key arrangement request is a legal authentication key arrangement request, the authentication key issuance unit 323 issues an authentication key for a limited time (for example, an authentication key available only within use reservation date and time of the vehicle 10B, included in the authentication key arrangement request, and buffer periods before and after the use reservation date and time). The authentication key issuance unit 323 then distributes the authentication key to the mobile terminal 20B of the rent user who rents the vehicle 10B identified by the authentication key arrangement request, via the communication processing unit 321.

As described above, the processing device 23 of the mobile terminal 20B of the rent user who rents the vehicle 10B includes the communication processing unit 231, the communication processing unit 232, the authentication key acquisition unit 233, the authentication request unit 234, the lock/unlock request unit 235, and the storage unit 230.

The authentication key acquisition unit 233 transmits an authentication key acquisition request to the B2C car sharing management server 80 via the communication processing unit 232 in response to a specified operation of the rent user who rents the vehicle 10B. At this time, the authentication key acquisition request includes a service login ID of the B2C car sharing site corresponding to the rent user who rents the vehicle 10B, or the like. Thus, the B2C car sharing management server 80 transmits an authentication key arrangement request to the center server 30 in response to the authentication key acquisition request. The center server 30 distributes an authentication key to the mobile terminal 20B in response to the authentication key arrangement request. As a result, the mobile terminal 20B can acquire the authentication key. Thus, the mobile terminal 20B can lock or unlock the doors of the vehicle 10B based on the functions of the communication processing unit 231, the authentication request unit 234, and the lock/unlock request unit 235. That is, with the B2C car sharing service, the rent user carrying the mobile terminal 20B who rents the vehicle 10B can directly use the vehicle 10B, for example, lock or unlock the vehicle 10B or drive the vehicle 10A, with use of the mobile terminal 20B without handing over a key to or from the company, or the like, of the vehicle 10B. Therefore, it is possible to improve the convenience of the rent user who rents the vehicle 10B with the B2C car sharing service in the authentication key management system 1.

Characteristic Operations of Center Server

Figure 7:
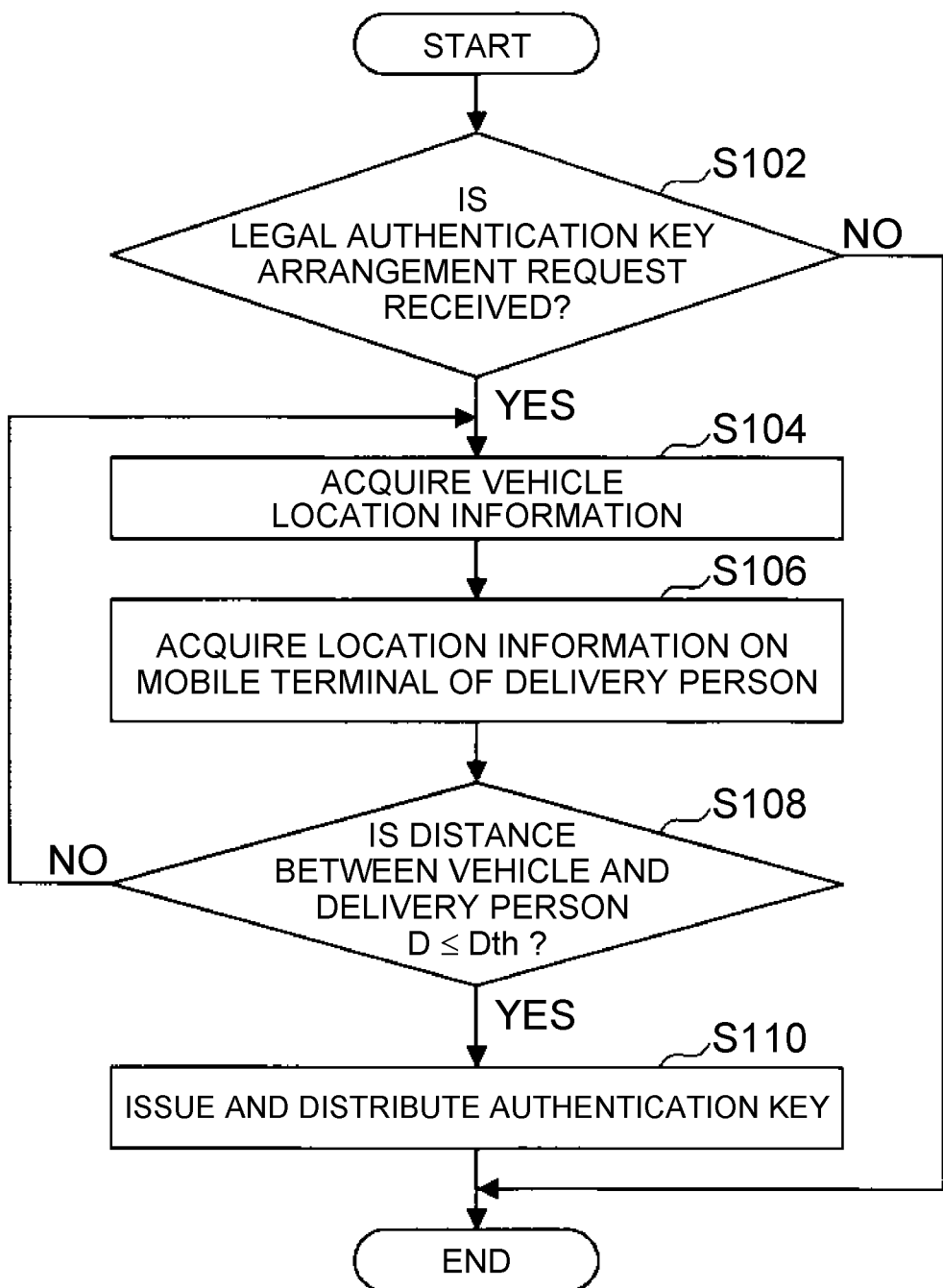
FIG. 7 is a flowchart schematically showing a first example of an authentication key distribution process by a center server.
Figure 8:
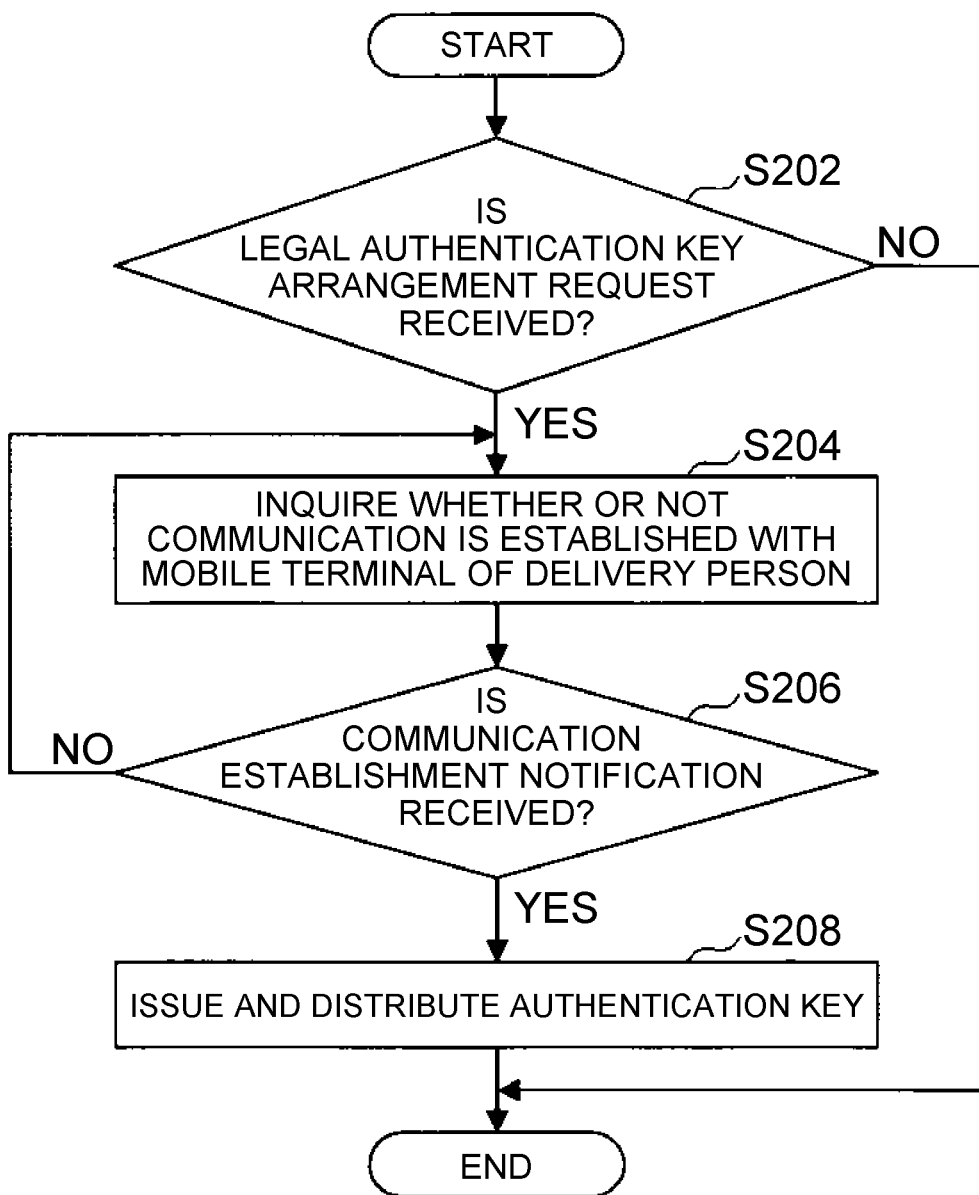
FIG. 8 is a flowchart schematically showing a second example of the authentication key distribution process by the center server.

Description is now given of the characteristic operations of the center server 30, that is, the process flow of a process (authentication key distribution process) in which the center server 30 distributes an authentication key to a delivery person with reference to FIGS. 7 to 9.

FIG. 7 is a flowchart schematically showing a first example of an authentication key distribution process by the center server 30. The process according to the flowchart is repeatedly executed at specified processing intervals. Hereinafter, this also applies to the flowcharts of FIGS. 8 and 9

In step S102, the authentication key issuance unit 323 determines whether or not a legal authentication key arrangement request is received from the delivery management server 50. Specifically, the authentication key issuance unit 323 determines whether or not the communication processing unit 321 receives the authentication key arrangement request from the delivery management server 50 and whether or not the condition determination unit 322 determines that the received authentication key arrangement request is a legal authentication key arrangement request. When the legal authentication key arrangement request is received from the delivery management server 50, the authentication key issuance unit 323 proceeds to step S104. Otherwise, the current process is ended.

In step S104, the location information management unit 324 acquires the location information on the vehicle 10A identified by the authentication key arrangement request.

In step S106, the delivery person location information acquisition unit 328 acquires the location information on the mobile terminal 20Ac carried by a delivery person identified in the authentication key arrangement request.

In step S108, the authentication key issuance unit 323 determines whether or not the delivery person has reached within a specified range in the vicinity of the vehicle 10A based on the location information on the vehicle 10A and the location information on the mobile terminal 20Ac of the delivery person. Specifically, the authentication key issuance unit 323 determines whether or not a distance D between the vehicle 10A and the delivery person (mobile terminal 20Ac) is equal to or less than a threshold Dth corresponding to the specified range. When the delivery person has reached within the specified range in the vicinity of the vehicle 10A, the authentication key issuance unit 323 proceeds to step S110. Otherwise, the process returns to step S104, and the process of steps S104 to S108 is repeated.

For example, there may be a case where, because of some reasons, such as the order of delivery being changed, the distance D between the vehicle 10A and the delivery person does not become equal to or less than the threshold Dth even after a certain amount of time passes from the start of the process of the present flowchart. Hence, for example, when a time limit may be set for the process according to the present flowchart in advance and the process according to the present flowchart does not end within the set time limit, the process according to the present flowchart may forcibly be ended.

In step S110, the authentication key issuance unit 323 issues an authentication key corresponding to the authentication key arrangement request, distributes the issued authentication key to the mobile terminal 20Ac of the delivery person, and ends the current process.

Thus, in the present example, the center server 30 determines whether or not the delivery person has reached within the specified range in the vicinity of the vehicle 10A based on the location information on the vehicle 10A and the location information on the mobile terminal of the delivery person. The center server 30 then distributes the authentication key to the delivery company (mobile terminal 20Ac of the delivery person), when the delivery person has reached within the specified range in the vicinity of the vehicle 10. Thus, the center server 30 can limit the opportunity in which the authentication key becomes usable before the timing when the delivery company actually requires the authentication key, that is, the timing when the delivery person reaches the vicinity of the vehicle 10A corresponding to the delivery destination. In short, the center server 30 can distribute an authentication key such that an inadequate use of the authentication key by the delivery company can be suppressed.

Next, FIG. 8 is a flowchart schematically showing a second example of the authentication key distribution process by the center server 30.

Since the process of step S202 is the same as step S102 of FIG. 7, description thereof is omitted.

In step S204, the authentication key issuance unit 323 makes an inquiry to the vehicle 10A about whether or not the BLE communication is established between the mobile terminal 20Ac of the delivery person and the vehicle 10A identified by the authentication key arrangement request, through the communication processing unit 321. At this time, the inquiry includes identification information that identifies the mobile terminal 20Ac of the delivery person identified by the authentication key arrangement request. Thus, the vehicle 10A (DCM 14) can confirm whether or not the counterpart (central side) of the established BLE communication is the mobile terminal 20Ac of the delivery person.

In step S206, the authentication key issuance unit 323 determines whether or not the communication processing unit 321 (one example of the reception unit) has received from the vehicle 10A a notification (communication establishment notification) notifying establishment of the BLE communication with the mobile terminals 20A of the delivery person. When receiving the communication establishment notification from the vehicle 10A, the authentication key issuance unit 323 determines that the delivery person has reached within the specified range in the vicinity of the vehicle 10A, and proceeds to step S208. When not receiving the communication establishment notification from the vehicle 10A, the authentication key issuance unit 323 determines that the delivery person is not yet reached within the specified range in the vicinity of the vehicle 10A, and returns to step S204 to repeat the process of steps S204, S206.

There may be a case where, because of some reasons, such as the order of delivery being changed, the communication establishment notification is not transmitted to the center server 30 from the vehicle 10A even after a certain amount of time passes from the start of the process of the present flowchart. Hence, for example, a time limit may be set for the process according to the present flowchart. When the process according to the present flowchart does not end within the set time limit, the process according to the present flowchart may forcibly be ended.

Since the process of step S208 is the same as step S110 of FIG. 7, description thereof is omitted.

Thus, in the present example, the center server 30 determines whether or not the delivery person has reached within the specified range in the vicinity of the vehicle 10A based on the presence or absence of the communication establishment notification from the vehicle 10A. The center server 30 then distributes the authentication key to the delivery company (mobile terminal 20Ac of the delivery person), when the delivery person has reached within the specified range in the vicinity of the vehicle 10 as in the case of FIG. 7. Thus, the center server 30 can distribute an authentication key such that an inadequate use of the authentication key by the delivery company can be suppressed as in the case of FIG. 7.

Next, FIG. 9 is a flowchart schematically showing a third example of the authentication key distribution process by the center server 30.

Since the process of step S302 is the same as step S102 of FIG. 7, description thereof is omitted.

In step S304, the authentication key issuance unit 323 confirms a delivery destination list (specifically, delivery destination list saved in the storage unit 320) received from the delivery management server 50 by the communication processing unit 321.

In step S306, the authentication key issuance unit 323 determines whether or not an authentication key has already been distributed to another package that is addressed to the delivery destination same as the delivery destination of the package identified by the authentication key arrangement request included in the delivery destination list. That is, the authentication key issuance unit 323 determines whether or not the authentication key of the intended vehicle 10A for the same delivery destination has already been distributed according to the process in the present flowchart performed for another package addressed to the same delivery destination included in the delivery destination list. When the authentication key is not yet distributed to another package that is addressed to the same delivery destination as the package identified by the authentication key arrangement request, the authentication key issuance unit 323 proceeds to step S308. When the authentication key has already been distributed, the authentication key issuance unit 323 ends the current process.

Since the process of step S308 is the same as step S110 of FIG. 7, description thereof is omitted.

Thus, in the present example, when there is a plurality of packages that the delivery person delivers to the trunk of the vehicle 10A at the same timing, and the authentication key is already distributed for one of the packages, the center server 30 does not issue the authentication key for other packages. That is, when there is a plurality of packages that the delivery person delivers to the trunk of the vehicle 10A at the same timing, the center server distributes an authentication key for each delivery by the delivery person. Thus, the center server 30 can prevent the situation where a plurality of unnecessary authentication keys is distributed to the mobile terminal 20Ac of the delivery person, although all the packages are delivered in one delivery session. In short, the center server 30 can distribute an authentication key such that an inadequate use of the authentication key by the delivery company can be suppressed.

When a user designates a plurality of packages to be delivered to the trunk of one vehicle 10A at the same time period, but the respective packages are to be delivered by different delivery companies, the authentication key issuance unit 323 naturally distributes an authentication key to each of the delivery companies. That is, the authentication key issuance unit 323 distributes an authentication key for each delivery by the delivery person and for each delivery company that takes charge of the delivery.

The process of FIG. 9 may be combined with one of the process of FIG. 7 and the process of FIG. 8. That is, when a delivery person reaches the vicinity of the intended vehicle 10A, the center server 30 may distribute an authentication key to the delivery company (the mobile terminal 20Ac of the delivery person) for each delivery session by the delivery person instead of for each package. In this case, for example, when the process of FIG. 7 is combined with the process of FIG. 9, the process of steps S304 and step S306 of FIG. 9 may be added between step S108 and step S110 of FIG. 7. For example, when the process of FIG. 8 is combined with the process of FIG. 9, the process of step S304 and step S306 of FIG. 9 may be added between step S206 and step S208 of FIG. 8.

Operation

In the present embodiment, the authentication key issuance unit 323 distributes, to a delivery company that provides a vehicle cabin delivery service that allows the inside of the vehicle 10A used by a user to be designated as a delivery destination of a package, key information (authentication key) used by a delivery person of the delivery company to unlock a specified door (for example, a trunk lid or the like) of the vehicle 10A. The arrival determination unit 329 determines whether or not the delivery person who delivers the intended package has reached within a specified range in the vicinity of the vehicle 10A corresponding to a delivery destination. When the arrival determination unit 329 determines that the delivery person has reached within the specified range of the vehicle 10A, the authentication key issuance unit 323 distributes an authentication key to the delivery company (specifically, the mobile terminal 20Ac of the delivery person).

Hence, the center server 30 can wait for the timing when the delivery person reaches the vicinity of the vehicle 10A (within a specified range), that is, the timing when the delivery company requires an authentication key, and then distribute the key information to the delivery company. Accordingly, the center server 30 can limit the opportunity in which the delivery company can inadequately use the authentication key. Therefore, the center server 30 can distribute an authentication key such that an inadequate use of the authentication key by the delivery company can be suppressed.

The center server 30 (authentication key issuance unit 323) may be configured to distribute the authentication key to the delivery management server 50, and the mobile terminal 20Ac of the delivery person may be configured to acquire the authentication key from the delivery management server 50.

In the present embodiment, the specified door of the vehicle 10A is unlocked by a specified transmission signal (for example, an authentication request, or the like) including the key information (authentication key) transmitted toward the vehicle 10A from the mobile terminal 20Ac carried by the delivery person who delivers the package.

Hence, the center server 30 can specifically distribute key information (authentication key) that can unlock the door of the vehicle 10A by using the key information configured to be included in a specified transmission signal transmitted toward the vehicle 10A from the mobile terminal 20Ac carried by the delivery person.

In the present embodiment, the location information management unit 324 acquires the location information on the vehicle 10A. The delivery person location information acquisition unit 328 also acquires the location information on the mobile terminal carried by the delivery person. The arrival determination unit 329 determines whether or not the delivery person has reached within the specified range in the vicinity of the vehicle 10A based on the location information on the vehicle 10A and the location information on the mobile terminal 20Ac carried by the delivery person.

Hence, the center server 30 can specifically determine whether or not the delivery person has reached the vicinity of the vehicle 10A or the like (within the specified range) based on the location information on the vehicle 10A and the location information on the mobile terminal 20Ac carried by the delivery person.

In the present embodiment, the arrival determination unit 329 determines that the delivery person has reached within the specified range of the vehicle 10A, when the communication processing unit 321 receives information (for example, communication establishment notification) that a communicable state (of BEL communication in accordance with BLE telecommunication standards, for example) for transmitting a transmission signal, such as an authentication request, toward the vehicle 10A from the mobile terminal 20Ac of the delivery person has been established between the mobile terminal 20Ac and the vehicle 10A in accordance with a specified mode.

Hence, the center server 30 can ascertain that the delivery person has reached the vicinity of the vehicle 10A (within the specified range) based on the information received from the vehicle 10A, the information indicating that the communicable state has been established between the mobile terminal 20Ac of the delivery person and the vehicle 10A in accordance with a specified mode. Therefore, the center server 30 can specifically determine that the delivery person has reached the vicinity of the vehicle 10A, based on the information received from the vehicle 10A, the information indicating that the communicable state has been established between the mobile terminal 20Ac of the delivery person and the vehicle 10A in accordance with a specified mode.

In the present embodiment, when the delivery person delivers a plurality of packages to the inside (into the vehicle cabin) of the vehicle 10A at the same timing, the authentication key issuance unit 323 distributes an authentication key for each delivery performed by the delivery person.

Hence, when a plurality of packages is collectively delivered with the inside (vehicle cabin) of the vehicle 10A as a delivery destination, the center server 30 can distribute an authentication key to the delivery company for each delivery session, that is, for a group of packages, instead of for each package. Hence, the center server 30 can avoid the situation where a plurality of authentication keys is distributed to the delivery company for the respective packages though the packages are collectively delivered in one delivery session. This makes it possible to limit the opportunity in which the delivery company can inadequately use the authentication key. Therefore, the center server 30 can distribute an authentication key such that an inadequate use of the authentication key by the delivery company can further be suppressed.

Although the modes for carrying out the present disclosure have been described in detail, the present disclosure is not limited to such specific embodiments. Various modifications and changes may be made without departing from the scope of the present disclosure as set forth by the appended claims.

For example, in the above-described embodiments, the mobile terminal 20 transmits an authentication request including an authentication key to the key unit 12, the key unit 12 exchanges signals with the lock/unlock and start device 11 in response to an authentication result based on the authentication key, and the lock/unlock and start device 11 implements locking or unlocking of the doors of the vehicle 10A or starting of the vehicle 10A. However, the present disclosure is not limited to this mode.

Specifically, the functions of the key unit 12 may be transferred to the mobile terminal 20, and the mobile terminal 20 may be configured to exchange signals based on the key information (internal key information) with the vehicle 10 (lock/unlock and start device 11) by LF radio waves and RF radio waves such that locking or unlocking of the doors of the vehicle 10A or starting of the vehicle 10A is implemented by the lock/unlock and start device 11. In this case, "authentication key" in the above-described embodiments may be read as "key information". That is, the center server 30 may issue key information instead of the authentication key, and distributes the key information to the mobile terminal 20 by a method similar to that of the authentication key in the above-described embodiments. Thus, operation and advantageous effects similar to those of the above-described embodiments are obtained.

The functions of the key unit 12 may be integrated into the lock/unlock and start device 11, and components (the LF radio wave transmitter 111, the RF radio wave receiver 112, the collation ECU 113, the LF radio wave receiver 121, and the RF radio wave transmitter 122) related to communication between the lock/unlock and start device 11 and the key unit 12 and authentication relating to the communication may be omitted. In this case, when authentication of the mobile terminal 20 is successful based on an authentication key, the key ECU 124 may directly output an unlock or lock command to the body ECU 114 or a start command to the engine ECU 116, instead of using the collation ECU 113, and cause the body ECU 114 to lock or unlock the doors of the vehicle 10 and cause the engine ECU 116 to start the vehicle 10. Thus, operation and advantageous effects similar to those of the above-described embodiments are demonstrated.

In the embodiments and modifications described above, transmission signals (authentication requests or the like) transmitted from a mobile terminal are used to lock or unlock (the doors of) a vehicle. However, the present disclosure is not limited to this mode. In the embodiments and modifications described above, (the doors of) the vehicle may be replaced with, for example, (the doors of) a building or a facility used by a user, such as a residence, a cottage, and a conference room.

Specifically, the vehicle cabin delivery service, the vehicle cabin pickup service, or the vehicle cabin collection service may be replaced with a delivery service, a pickup service, or a collection service that can designate the inside of a building (for example, a residence or a privately-owned cottage) or a facility (for example, a vacation cottage for rent, a conference room, or the like) as a delivery destination, a pickup destination, or a collection destination of packages, articles, or the like. At this time, "the inside of a facility" may refer to a place protected from intrusion from the outside due to the facility being locked. The place may include not only the inside of a facility building, but also, for example, an uncovered place surrounded with a relatively high external wall that defines the facility.

More specifically, in the case where the inside of a building or a facility used by a user is designated as a delivery destination, an authentication key may be distributed when the delivery person reaches the vicinity of the intended building or facility as in the case of FIGS. 7 and 8. At this time, the same method as in FIGS. 7 and 8 may be used as a method for determining whether or not the delivery person has reached the vicinity of the intended building or facility. In the case where the inside of a building or a facility used by a user is designated as a delivery destination, and a plurality of packages is delivered to the inside of the building or the facility at the same timing by a delivery person as in the case of FIG. 9, an authentication key may be distributed for each delivery session by the delivery person, instead of for each package. In the case where the inside of a building or a facility used by a user is designated as a delivery destination, the above configurations may be combined as described above. Hence, as in the case of the embodiments and modifications described above, an authentication key can be distributed such that an inadequate use of the authentication key by the delivery company is further suppressed.

The B2C car sharing service may be replaced with a B2C sharing service that lends a facility (for example, a vacation cottage for rent, a conference room, a gymnasium, or the like) that is owned by a company or an organization and made available to a plurality of users in different time periods. This makes it possible to share, between general consumers, the facility that is owned by a company or an organization and made available to a plurality of users in different time periods.

The C2C car sharing service may be replaced with a C2C sharing service that assists in lending or renting one or some rooms of a privately-owned residence or cottage, or the entire residence or cottage between individuals. This enables individuals to share one or some rooms of a privately-owned residence or cottage, or the entire residence or cottage.

What is claimed is:
1. A key information management device, comprising:
a central processing unit (CPU); and
a memory coupled to the CPU and configured to store key information,
wherein the CPU is configured to:
distribute the key information to a company that provides a delivery service that allows an inside of a vehicle, a building, and a residence of a user to be designated as a delivery destination of a package, the key information being used by a delivery person of the company to unlock a specified entrance of the residence,
when a plurality of packages are to be collectively delivered, distribute a single piece of the key information for a set of the packages by
determining whether the key information has been distributed for one package in the packages to be delivered to the designated delivery destination at the same timing, and
when determining that the key information has been distributed for the one package, not distributing the key information for the rest of the packages to be delivered to the designated delivery destination at the same timing, and
when the packages are to be respectively delivered by different delivery companies, distribute plural pieces of the key information respectively to the different delivery companies.

2. The key information management device according to claim 1, wherein the specified entrance is configured to be unlocked by a specified transmission signal including the key information transmitted toward the residence from a mobile terminal carried by the delivery person who delivers the package.

3. The key information management device according to claim 2, wherein the CPU is further configured to:
acquire location information on the residence;
acquire location information on the mobile terminal carried by the delivery person; and
determine whether or not the delivery person has reached within a specified range of the residence based on the location information on the residence, and on the location information on the mobile terminal.

4. The key information management device according to claim 2, wherein the CPU is further configured to:
receive, from the residence, information that a communicable state for transmitting the transmission signal toward the residence from the mobile terminal of the delivery person has been established between the mobile terminal, and the residence in accordance with a specified mode; and
when receiving the information, determine that the delivery person has reached within a specified range of the residence.

5. A management method of key information, comprising:
distributing key information to a company that provides a delivery service that allows an inside of a vehicle, a building, and a residence of a user to be designated as a delivery destination of a package, the key information being used by a delivery person of the company to unlock a specified entrance of the residence;
when a plurality of packages are to be collectively delivered, distributing a single piece of the key information for a set of the packages; and
distributing plural pieces of the key information respectively to different delivery companies when the packages are to be respectively delivered by the different delivery companies, wherein the distribution of the single piece of the key information for the set of the packages includes:
- determining whether the key information has been distributed for one package in the packages to be delivered to the designated delivery destination at the same timing, and
- when determining that the key information has been distributed for the one package, not distributing the key information for the rest of the packages to be delivered to the designated delivery destination at the same timing.

6. A computer-readable non-transitory storage medium storing a key information management program that, when executed by a computer, causes the computer to perform:
- distributing key information to a company that provides a delivery service that allows an inside of a vehicle, a building, and a residence of a user to be designated as a delivery destination of a package, the key information being used by a delivery person of the company to unlock a specified entrance of the residence;
- when a plurality of packages are to be collectively delivered, distributing a single piece of the key information for a set of the packages; and
- distributing plural pieces of the key information respectively to different delivery companies when the packages are to be respectively delivered by the different delivery companies, wherein the distribution of the single piece of the key information for the set of the packages includes:
- determining whether the key information has been distributed for one package in the packages to be delivered to the designated delivery destination at the same timing, and
- when determining that the key information has been distributed for the one package, not distributing the key information for the rest of the packages to be delivered to the designated delivery destination at the same timing.

* * * * *